US009372822B2

(12) United States Patent
Yoshizawa

(10) Patent No.: US 9,372,822 B2
(45) Date of Patent: Jun. 21, 2016

(54) MATHEMATICAL EXPRESSION DISPLAY CONTROL APPARATUS, MATHEMATICAL EXPRESSION DISPLAY CONTROL METHOD, AND COMPUTER READABLE MEDIUM RECORDING MATHEMATICAL EXPRESSION DISPLAY CONTROL PROGRAM

(71) Applicant: CASIO COMPUTER CO., LTD., Shibuya-ku, Tokyo (JP)

(72) Inventor: Hiroaki Yoshizawa, Ome (JP)

(73) Assignee: CASIO COMPUTER CO., LTD., Tokyo (JP)

(*) Notice: Subject to any disclaimer, the term of this patent is extended or adjusted under 35 U.S.C. 154(b) by 293 days.

(21) Appl. No.: 14/228,991

(22) Filed: Mar. 28, 2014

(65) Prior Publication Data

US 2014/0297702 A1    Oct. 2, 2014

(30) Foreign Application Priority Data

Mar. 29, 2013  (JP) ................................. 2013-073994
Sep. 20, 2013  (JP) ................................. 2013-196182

(51) Int. Cl.
G06F 15/02    (2006.01)

(52) U.S. Cl.
CPC ............ *G06F 15/02* (2013.01); *G06F 15/0225* (2013.01)

(58) Field of Classification Search
None
See application file for complete search history.

(56) References Cited

U.S. PATENT DOCUMENTS

| 5,309,380 A * | 5/1994 | Satoh ................... G06F 15/0225 |
| | | 708/137 |
| 7,827,221 B2 * | 11/2010 | Katayama ............. G06F 9/4443 |
| | | 708/137 |
| 8,214,413 B2 * | 7/2012 | Katayama ............... G06F 15/16 |
| | | 708/130 |
| 2009/0210466 A1 | 8/2009 | Katayama |
| 2014/0297702 A1 * | 10/2014 | Yoshizawa .......... G06F 15/0225 |
| | | 708/146 |

FOREIGN PATENT DOCUMENTS

| JP | 2008-146289 A | 6/2008 |
| JP | 2009-199174 A | 9/2009 |

* cited by examiner

*Primary Examiner* — David H Malzahn
(74) *Attorney, Agent, or Firm* — Holtz, Holtz & Volek PC

(57) ABSTRACT

A mathematical expression display control apparatus includes a mathematical expression input unit, a mathematical expression display control unit, a cursor display control unit, an inverse number function input unit, an inverse number target detection unit and an inverse number display control unit. The mathematical expression input unit recognizes a mathematical expression. The mathematical expression display control unit displays the recognized mathematical expression on a display unit. The cursor display control unit moves and displays a cursor in the displayed mathematical expression. The inverse number function input unit recognizes an inverse number function. The inverse number target detection unit detects a chunk region of the mathematical expression as a target of the inverse number function. The inverse number display control unit replaces the detected chunk region with a fraction having the detected chunk region as a denominator and 1 as a numerator to display.

16 Claims, 24 Drawing Sheets

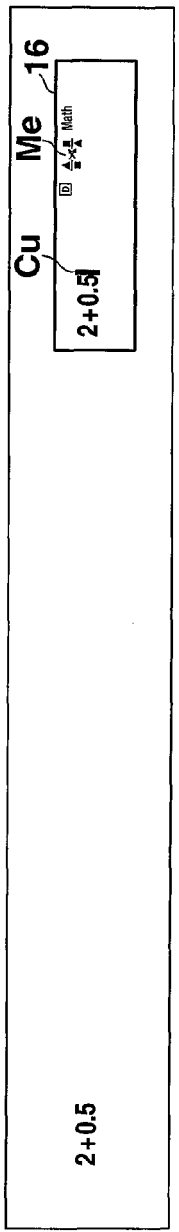
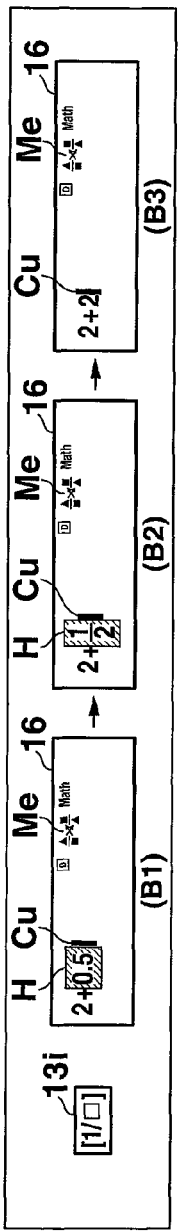
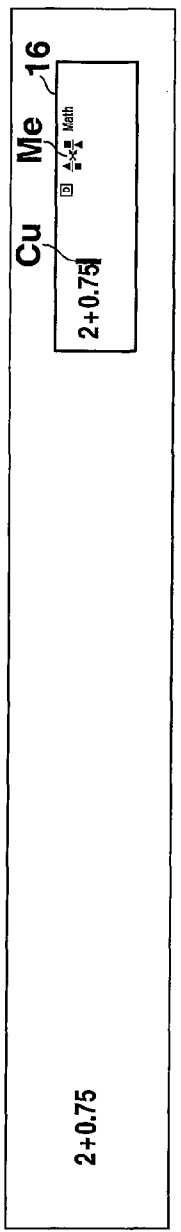
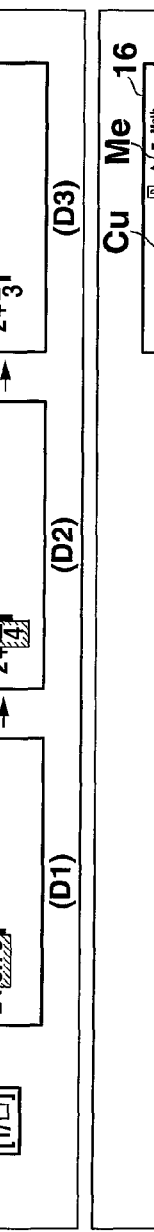
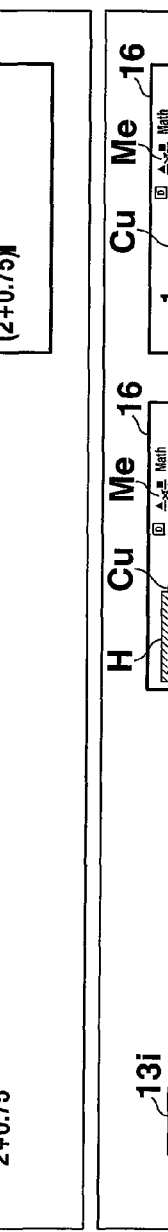
FIG.17A FIG.17B FIG.17C FIG.17D FIG.17E FIG.17F

FIG.18
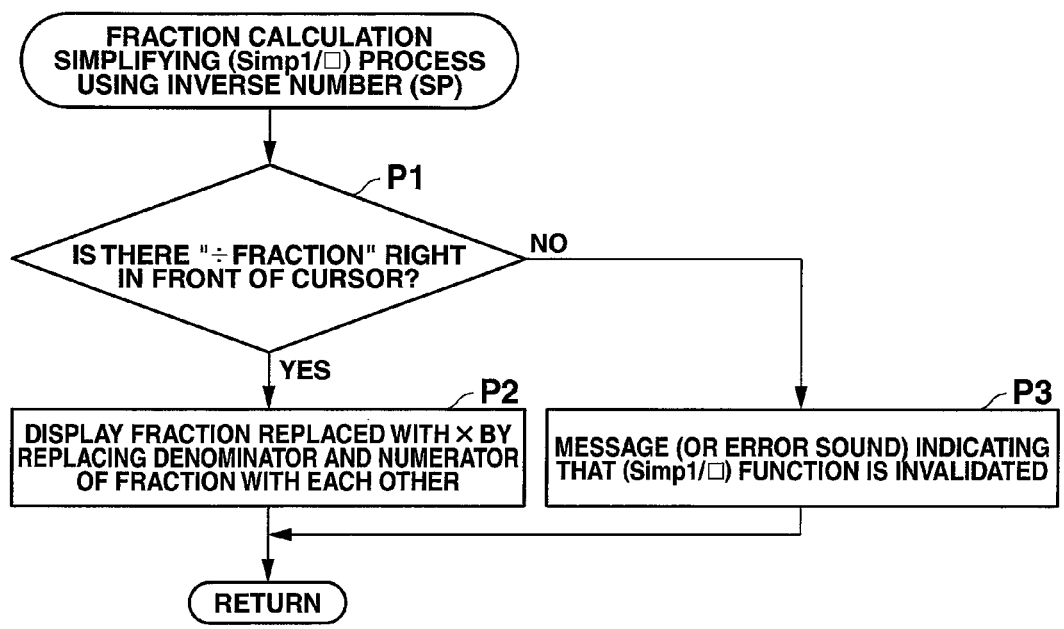
FIG.19A
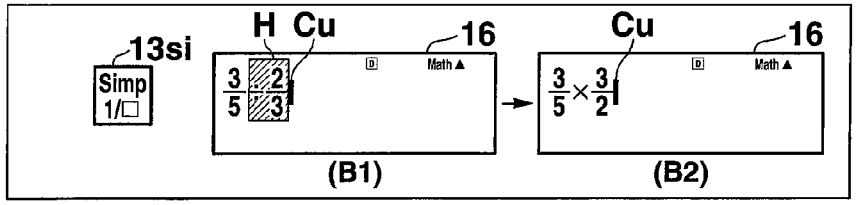
FIG.19B

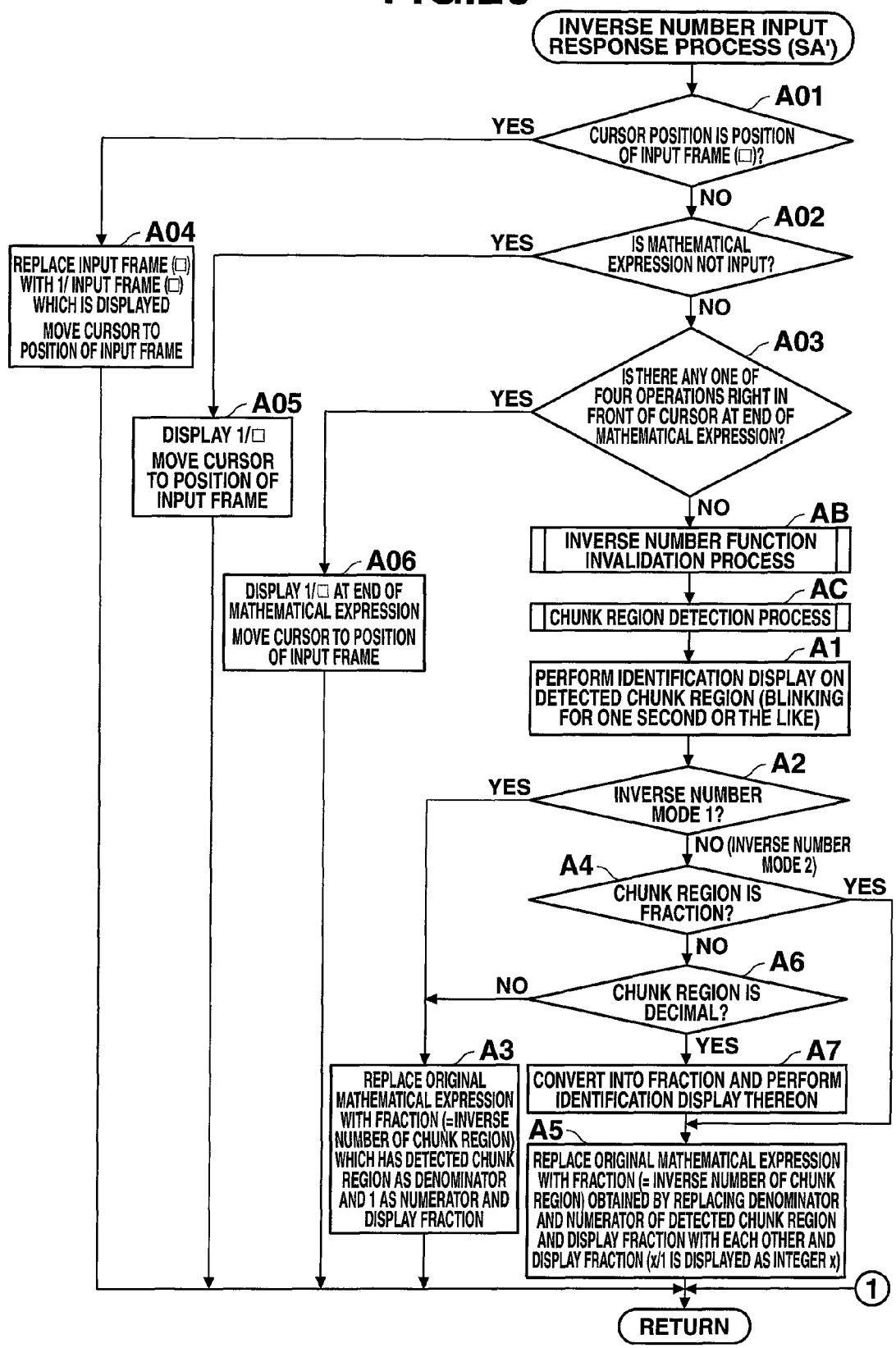

MATHEMATICAL EXPRESSION DISPLAY CONTROL APPARATUS, MATHEMATICAL EXPRESSION DISPLAY CONTROL METHOD, AND COMPUTER READABLE MEDIUM RECORDING MATHEMATICAL EXPRESSION DISPLAY CONTROL PROGRAM

CROSS-REFERENCE TO RELATED APPLICATIONS

This application claims priority based on Japanese Patent Application Nos. 2013-073994, filed on Mar. 29, 2013, and 2013-196182, filed on Sep. 20, 2013, the entire contents of which are incorporated by reference herein.

BACKGROUND OF THE INVENTION

1. Field of the Invention

The present invention relates to a mathematical expression display control apparatus, a mathematical expression display control method, and a computer readable medium recording mathematical expression display control program thereon, capable of naturally displaying a mathematical expression.

2. Description of the Related Art

In the related art, in an electronic calculator called a scientific electronic calculator, a mathematical expression which is input with keys by a user or a calculation result thereof is displayed in one row in a notation form as it is for the most part.

For example, in a case where a mathematical expression with a power format is input, an exponent cannot be naturally displayed on the upper right side of a symbol or a number which is a base thereof. Therefore, if "X" is squared, this is displayed in one row such as "X^2".

In addition, for example, in the same manner for a case of a mathematical expression including a fraction, a numerator and a denominator with a fraction symbol interposed therebetween cannot be vertically naturally displayed, and thus inputting such as "A/B" is performed and is displayed in one row as it is.

Therefore, a scientific electronic calculator is considered which allows a mathematical expression to be displayed in a natural format as printed in a textbook. In addition, a scientific electronic calculator is considered in which, if a mathematical expression is input and a fraction key [a/b] is pressed, a fraction of which a numerator incorporates a forward mathematical expression chunk part at a cursor position and a denominator incorporates a backward mathematical expression chunk part is displayed (for example, refer to JP-A-2009-199174).

As above, the scientific electronic calculator, which can display, in a natural notation form, a function (2D (dimension) function) such as a power or a fraction required to be displayed in a vertically overlapping manner, has a great effect on teaching mathematics to beginners including elementary school students and middle school students.

In general school education teaching mathematics to beginners, learning of an inverse number is performed in relation to learning of a fraction. In this case, learning of an inverse number of a numerical value X which is not "0" is performed in a fraction form such as "1/X".

However, in a scientific electronic calculator of the related art, an inverse number of the numerical value X is displayed in a power format such as "$X^{-1}$" (or "X^-1") which is not learned in schools, and is calculated, and thus it is hard to use such a scientific electronic calculator as a proper learning tool.

The present invention has been made in consideration of these circumstances, and an object thereof is to provide a mathematical expression display control apparatus, a mathematical expression display control method, and a mathematical expression display control program, enabling calculation regarding an inverse number to be appropriately learned in association with a fraction.

SUMMARY OF THE INVENTION

According to one aspect of the present invention, a mathematical expression display control apparatus which naturally displays a mathematical expression, includes a mathematical expression input unit, a mathematical expression display control unit, a cursor display control unit, an inverse number function input unit, an inverse number target detection unit and an inverse number display control unit. The mathematical expression input unit recognizes a mathematical expression based on user's input operations. The mathematical expression display control unit displays the mathematical expression recognized by the mathematical expression input unit on a display unit. The cursor display control unit moves and displays a cursor based on a user's operation, with respect to the mathematical expression displayed by the mathematical expression display control unit. The inverse number function input unit recognizes an inverse number function based on a user's input operation. The inverse number target detection unit detects a chunk region of the mathematical expression which is a target of the inverse number function in a predetermined direction from a position of the displayed cursor with respect to the mathematical expression, based on the inverse number function recognized by the inverse number function input unit. The inverse number display control unit replaces the chunk region of the mathematical expression detected by the inverse number target detection unit with a fraction which has the detected chunk region as a denominator and 1 as a numerator and displays the replaced fraction.

BRIEF DESCRIPTION OF THE DRAWINGS

FIGS. 17A to 17F are diagrams illustrating a display operation (third) based on a user's operation during the inverse number input response process in the educational inverse mode Me of the scientific electronic calculator.

FIG. 18 is a flowchart illustrating a fraction calculation simplifying process using an inverse number performed in the mathematical expression display control process of the scientific electronic calculator.

FIGS. 19A and 19B are diagrams illustrating a display operation based on a user's operation during the fraction calculation simplifying process using an inverse number of the scientific electronic calculator.

FIG. 20 is a flowchart illustrating an inverse number input response process of another embodiment performed in the mathematical expression display control process of the scientific electronic calculator.

DETAILED DESCRIPTION OF THE INVENTION

Embodiments of the present invention will be described with reference to the drawings.

Figure 1:
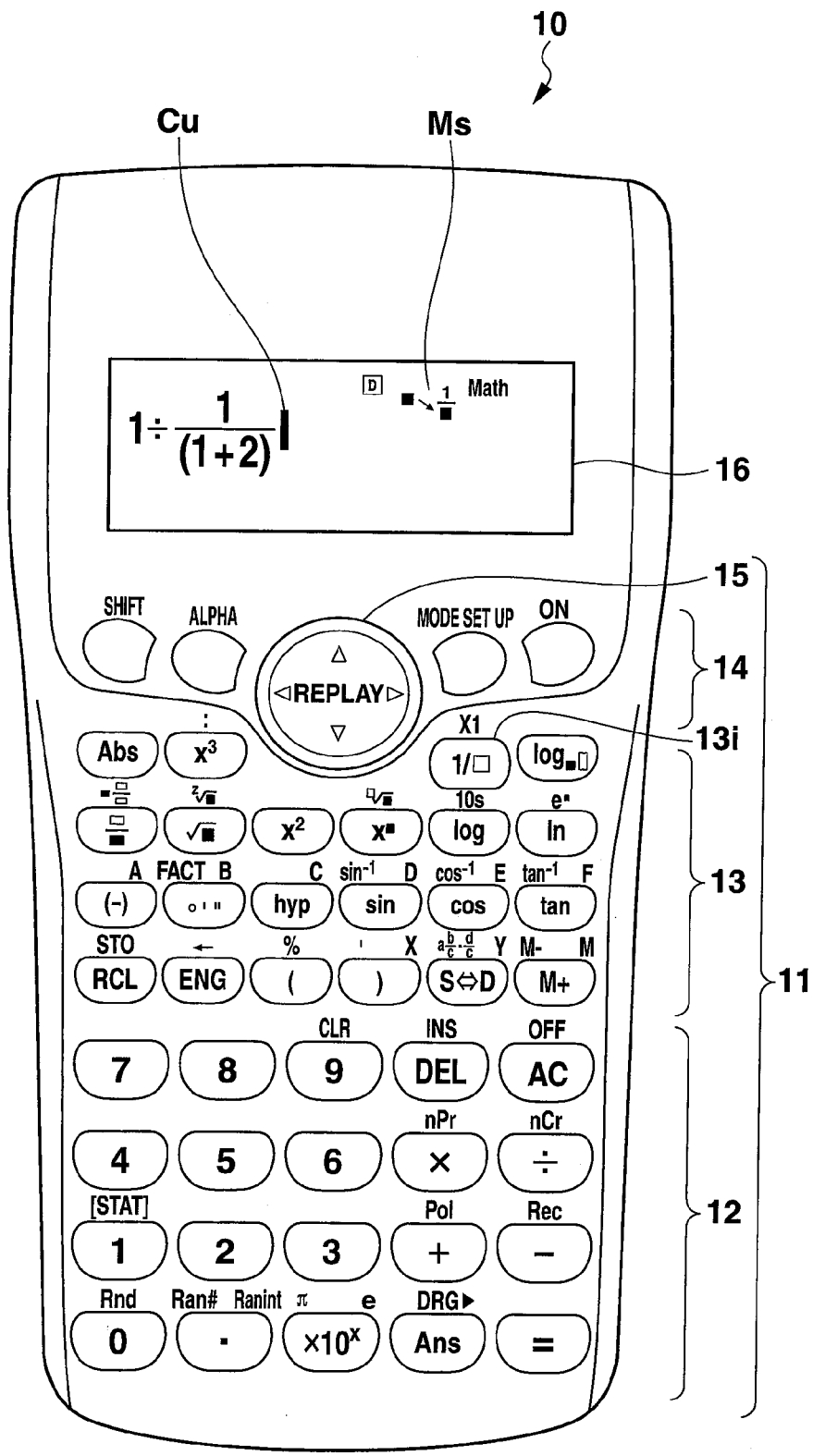
FIG. 1 is a front view illustrating an exterior configuration of a scientific electronic calculator according to an embodiment of a mathematical expression display control apparatus of the present invention.

FIG. 1 is a front view illustrating an exterior configuration of a scientific electronic calculator 10 according to an embodiment of a mathematical expression display control apparatus of the present invention.

The mathematical expression display control apparatus is formed by a portable apparatus (scientific electronic calculator 10) for calculation only described later, or is formed by a touch panel type personal digital assistants (PDA), a personal computer (PC), a mobile phone, an electronic book, a portable game machine, or the like having a calculation function.

The scientific electronic calculator 10 has a small size which allows a user to grasp the calculator with one hand and to operate the calculator with the other hand out of the need for portability, and a key input unit 11 and a display unit 16 are provided on a main body front face of the scientific electronic calculator 10.

The key input unit 11 is provided with a numerical value/operation symbol key group 12 for inputting a numerical value or a mathematical expression or instructing execution of calculation; a function input key group 13 for inputting various functions or starting a memory function; a mode setting key group 14 for displaying menu screens of various operation modes or instructing an operation mode to be set; and a cursor key 15 for performing a movement operation of a cursor Cu displayed on the display unit 16 or a selection operation of a data item.

As the numerical value/operation symbol key group 12, [0] to [9] (numerical values) keys, [+], [−], [x] and [÷] (symbols of four operations) keys, [Ans] and [=] (execution) keys, a [AC] (clear) key, and the like arranged.

As the function input key group 13, a [1/□] (inverse number) key 13$i$, a [√□] (root) key, a [□/□] (fraction) key, a [sin] (sine) key, a [M+] (memory plus) key, and the like are arranged.

As the mode setting key group 14, a [MODE] key, a [SHIFT] key, a [ON] (power supply) key, and the like are arranged.

In addition, in the present embodiment, a function such as "√" (root), "a/b" (fraction), or "X$^2$" (power function), which is required to be displayed using a special symbol in one row display, and is required to develop a number or a function symbol thereof two-dimensionally and to be displayed in a vertically overlapping manner, is referred to as a 2D (dimension) function. In the present specification, due to a restriction on inputting of characters, 2D functions except for a power are written in one row display.

In the [1/□] (inverse number) key 13$i$, a fraction symbol having a natural notation form is described. The fraction symbol has an inverse number target (which is described as □) as a denominator and "1" as a numerator. Specifically, in the [1/□] (inverse number) key 13$i$, a vinculum "–" is described. And, "1" is described above the vinculum and □ which can be input as an inverse number target is described under the vinculum, as a fraction symbol which has a natural notation form.

Here, an inverse number process, which is activated by the [1/□] (inverse number) key 13$i$, and is aimed at incorporating a mathematical expression in a range corresponding to a position of the cursor Cu and converting the mathematical expression for display, includes two processes, that is, a process in a scientific inverse mode and a process in an educational inverse mode, and the two inverse number modes are appropriately changed based on a user's operation.

In addition, in a state "1" in which the scientific inverse mode is set, a scientific inverse mode mark [□→1/□] Ms is displayed in a state display area of the display unit 16 (refer to FIGS. 10A to 10E), and, in a state "2" in which the educational inverse mode is set, an educational inverse mode mark [Δ/□→□/Δ] Me is displayed (refer to FIGS. 15A to 15G).

The display unit 16 includes a dot matrix type liquid crystal display unit.

Figure 2:
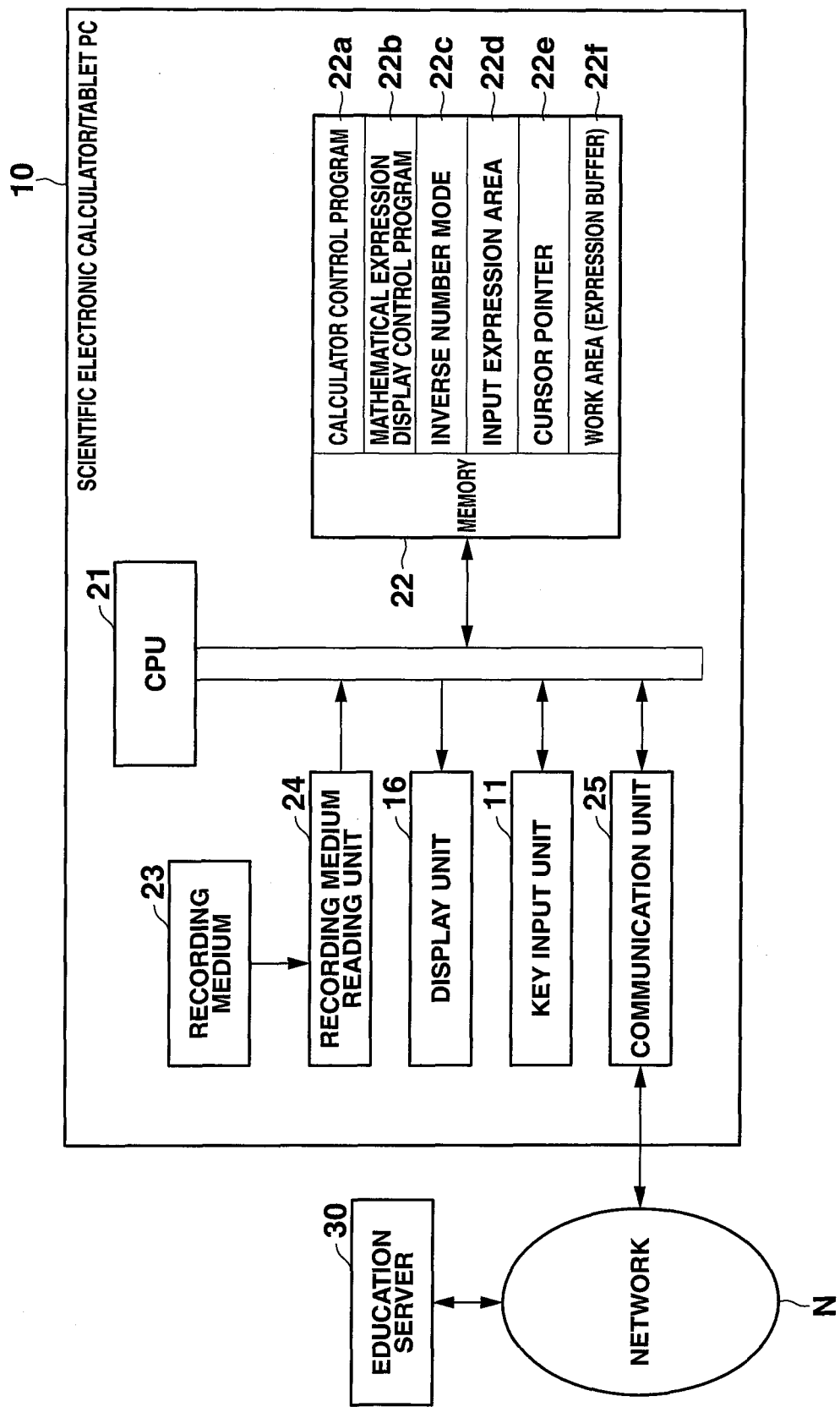
FIG. 2 is a block diagram illustrating a configuration of an electronic circuit of the scientific electronic calculator.

FIG. 2 is a block diagram illustrating a configuration of an electronic circuit of the scientific electronic calculator 10.

The electronic circuit of the scientific electronic calculator 10 includes a CPU 21 which is a computer.

The CPU 21 controls each part of the circuit according to a calculator control program 22a and a mathematical expression display control process 22b, which are stored in a memory 22 in advance, read to the memory 22 from an external recording medium 23 such as a memory card via a recording medium reading unit 24, or downloaded to the memory 22 from a web server (here, an education server) on a network via a communication unit 25, so as to perform various operation processes by recognizing and receiving key input signals according to a user's input operation to the key input unit 11.

The memory 22 does not store only the calculator control program 22a and the mathematical expression display control process 22b, but also secures an inverse number mode setting memory 22c, an input expression area 22d, a cursor pointer area 22e, and a work area (expression buffer) 22f.

In the inverse number mode setting memory 22c, a mode data "1" is stored in a state in which the scientific inverse mode is set, and a mode data "2" is stored in a state in which the educational inverse mode is set.

Data on key codes which are key-input by the key input unit 11 is sequentially input to the input expression area 22d, and data on a mathematical expression formed thereby is stored therein. For example, a numerical value key is stored by a code indicating a number thereof, a function key such as "sin" is stored by a code indicating a function thereof, and arithmetic symbol keys such as "+", "−", "×", and "÷" are stored by codes indicating arithmetic symbols thereof.

The cursor pointer area 22e stores pointer data indicating a location of the cursor Cu which is moved and displayed by an operation of the cursor key 15, in data on mathematical expression which is stored in the input expression area 22d and is also displayed on the display unit 16.

The work area (expression buffer) 22f temporarily stores a variety of data which is input to and output from the CPU 21 as necessary according to the calculator control program 22a and mathematical expression display control process 22b. For example, in a case where [1/□] (inverse number) key 13i is input, a mathematical expression present further forward than a location of the cursor Cu stored in the cursor pointer area 22e is read in the data on the mathematical expression stored in the input expression area 22d, and is temporarily stored in the work area (expression buffer) 22f.

In the scientific electronic calculator 10 with this configuration, the CPU 21 controls an operation of each part of the circuit according to commands described in the calculator control program 22a and the mathematical expression display control process 22b, and software and hardware are operated in cooperation with each other, thereby realizing a mathematical expression display control function suitable for conversion display of a mathematical expression into an inverse number, described below.

Figure 3:
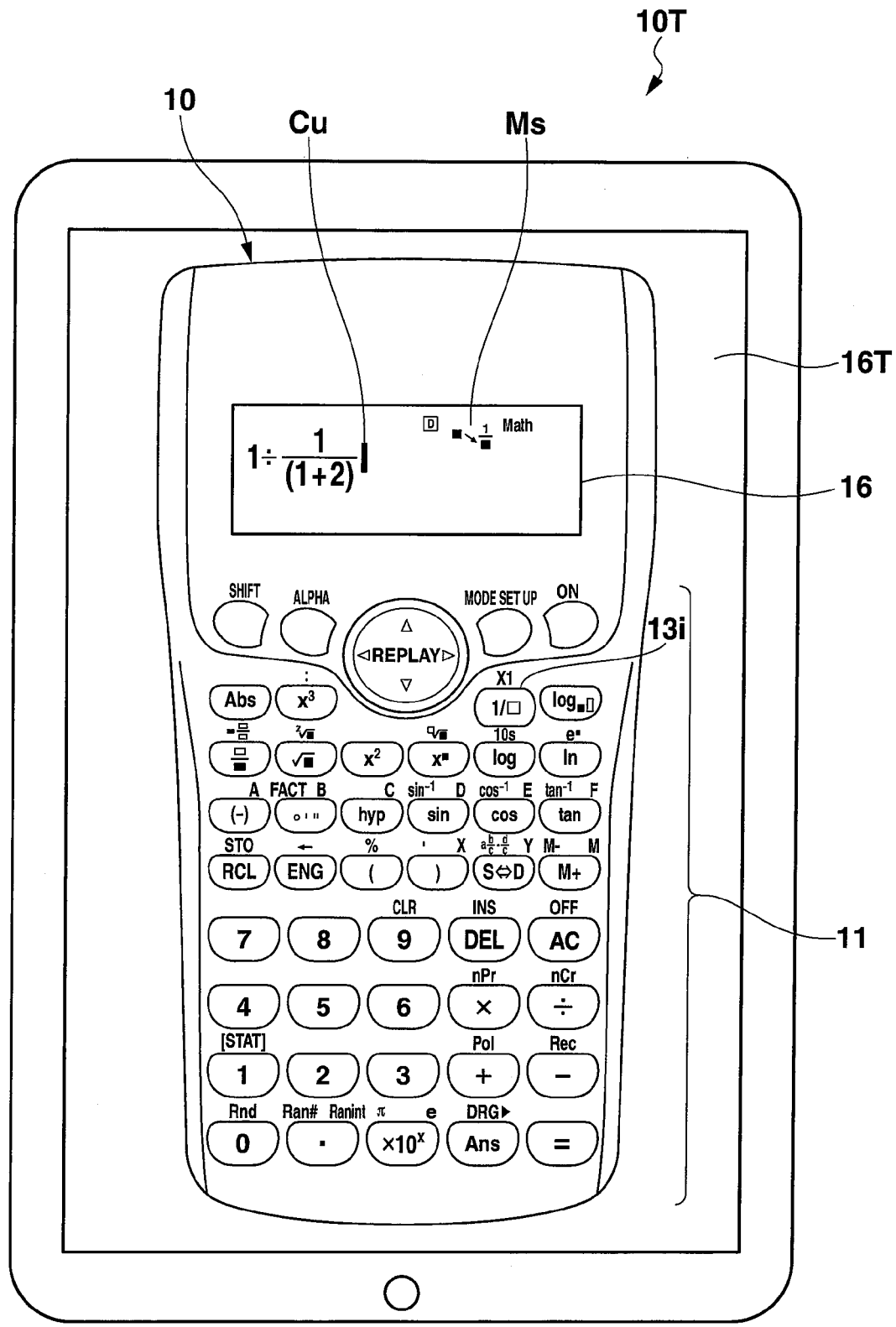
FIG. 3 is a front view of an exterior configuration of a tablet PC according to another embodiment of the mathematical expression display control apparatus of the present invention.

In addition, an embodiment of the mathematical expression display control apparatus is described in relation to a case of being realized by the scientific electronic calculator 10, but may be realized in a tablet PC 10T as well, as illustrated in FIG. 3. That is, an application program of a scientific electronic calculator emulator into which the calculator control program 22a and the mathematical expression display control process 22b are incorporated is executed, so as to perform input and display operations based on each program on a touch panel type color display unit 16T, thereby realizing the embodiment.

FIG. 3 is a front view illustrating an exterior configuration of the tablet PC 10T according to another embodiment of the mathematical expression display control apparatus of the present invention.

In the tablet PC 10T of FIG. 3, a display operation is displayed in which, in a state of setting the scientific inverse mode, the scientific inverse mode mark [□→1/□] Ms is displayed in a state display area of the touch panel type color display unit 16T, and, due to inputting of the [1/□] (inverse number) key 13i, a mathematical expression chunk region "(1+2)" which is received based on a position of the cursor Cu in the mathematical expression "1÷(1+2)" is converted into an inverse number "1/(1+2)".

Next, a description will be made as an inverse number mode setting function and a mathematical expression display control function of the scientific electronic calculator 10 with the above configuration.

Figure 4:
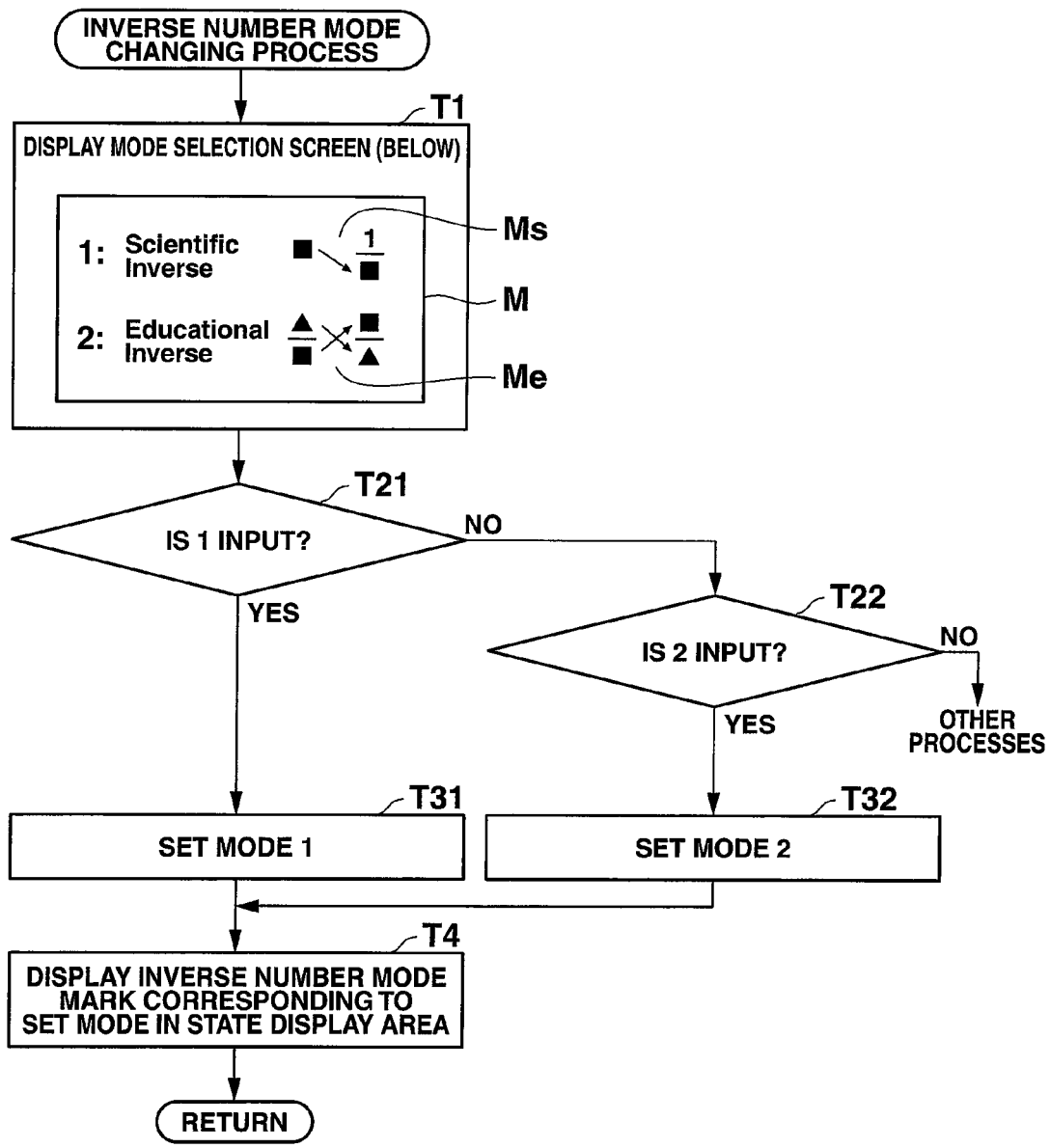
FIG. 4 is a flowchart illustrating an inverse number mode setting process of the scientific electronic calculator.

FIG. 4 is a flowchart illustrating an inverse number mode setting process of the scientific electronic calculator 10.

Figure 5:
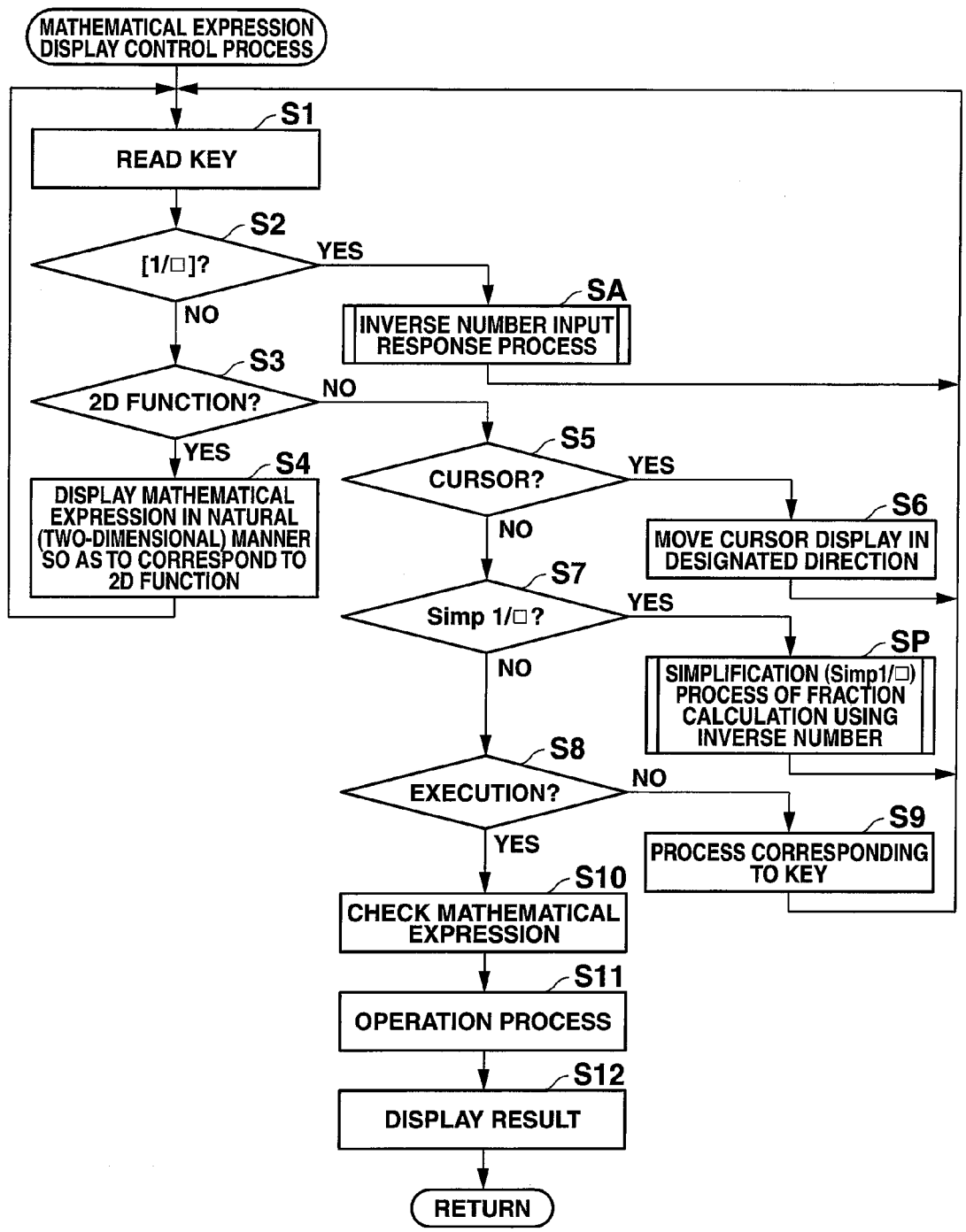
FIG. 5 is a flowchart illustrating a mathematical expression display control process of the scientific electronic calculator.

FIG. 5 is a flowchart illustrating a mathematical expression display control process of the scientific electronic calculator 10.

Figure 6:
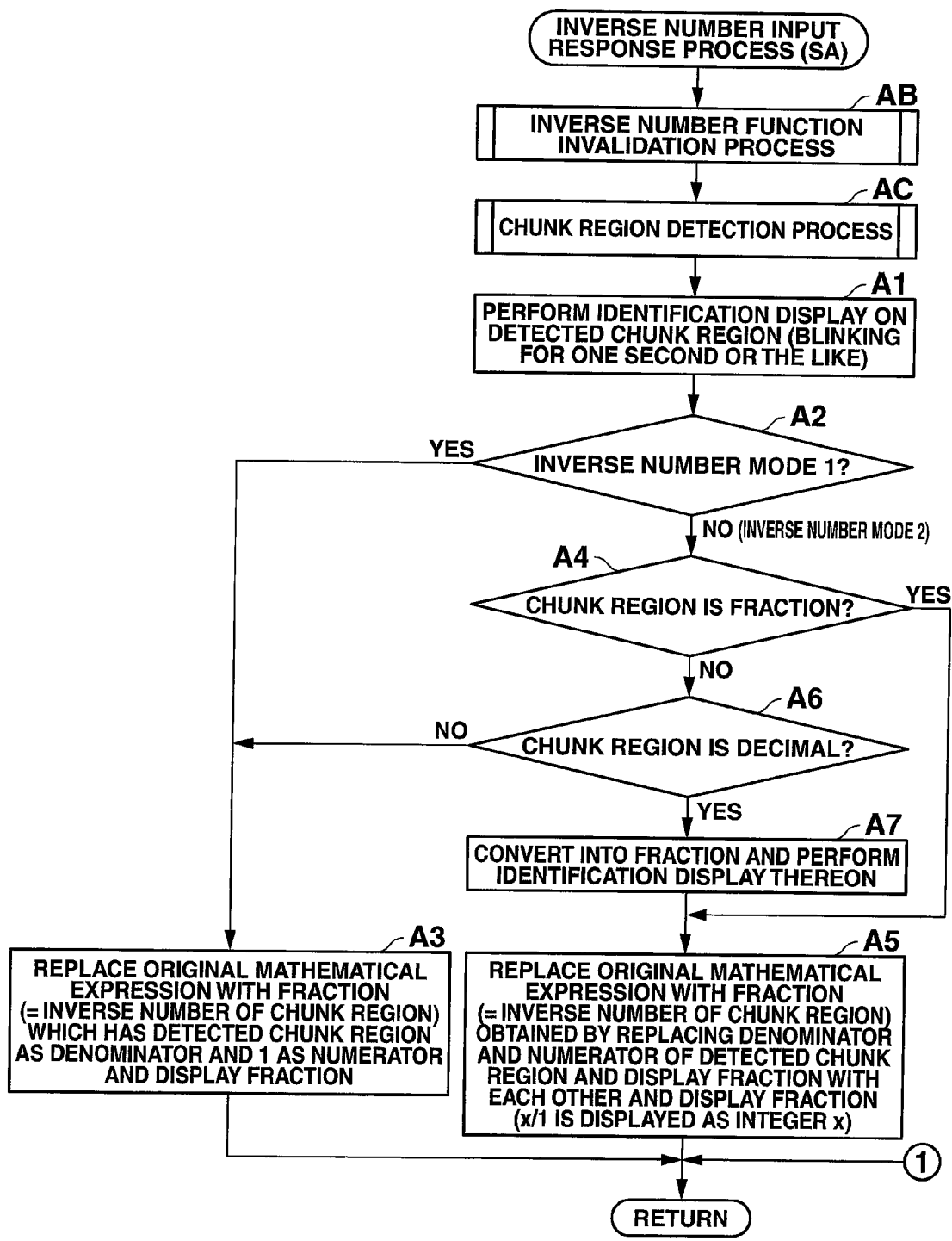
FIG. 6 is a flowchart illustrating an inverse number input response process performed in the mathematical expression display control process of the scientific electronic calculator.

FIG. 6 is a flowchart illustrating an inverse number input response process performed in the mathematical expression display control process of the scientific electronic calculator 10.

Figure 7:
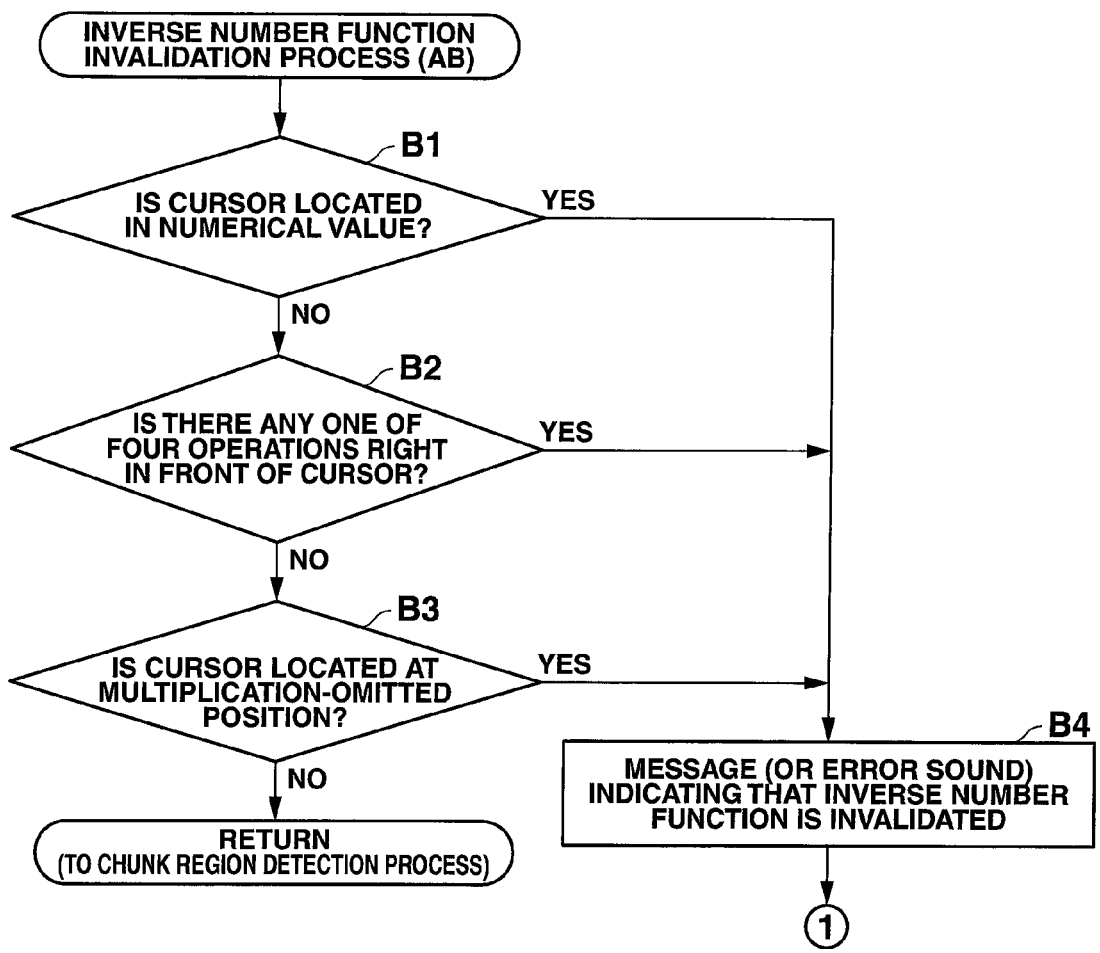
FIG. 7 is a flowchart illustrating an inverse number function invalidation process performed in the inverse number input response process of the scientific electronic calculator.

FIG. 7 is a flowchart illustrating an inverse number function invalidation process performed in an inverse number input response process of the scientific electronic calculator 10.

Figure 8:
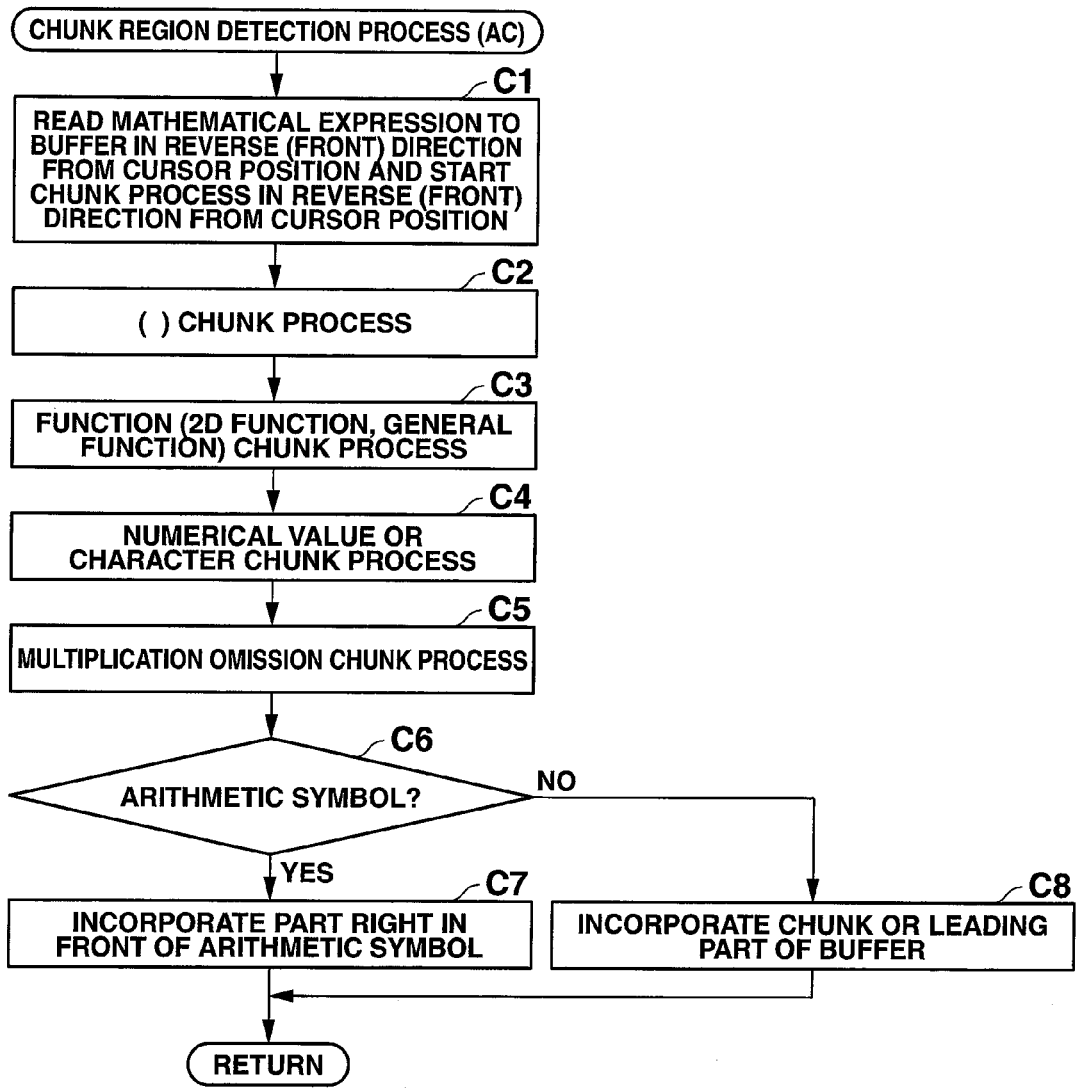
FIG. 8 is a flowchart illustrating a chunk region detection process performed in the inverse number input response process of the scientific electronic calculator.

FIG. 8 is a flowchart illustrating a chunk region detection process performed in the inverse number input response process of the scientific electronic calculator 10.

Inverse Number Mode Setting Function

Figure 9:
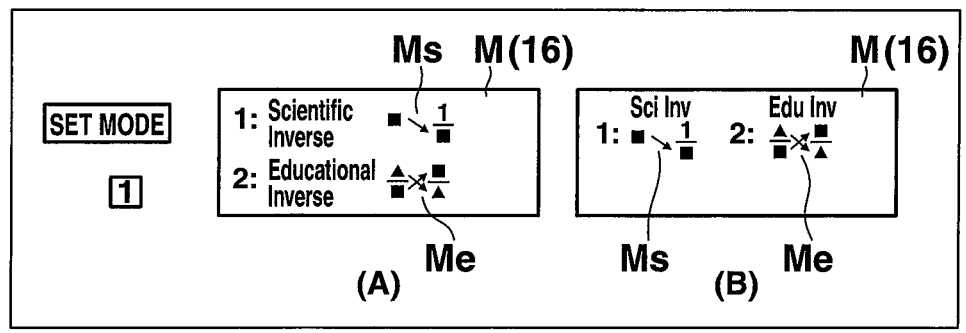
FIG. 9 is diagram illustrating a display operation based on a user's operation during the inverse number mode setting process of the scientific electronic calculator.

FIG. 9 is a diagram illustrating a display operation based on a user's operation performed during the inverse number mode setting process of the scientific electronic calculator 10.

If an inverse number mode setting item is selected in an operation mode menu screen (not illustrated) displayed on the display unit 16 in accordance with inputting of the [MODE] key of the key input unit 11, an inverse number mode selection screen M, in which the scientific inverse mode is displayed as an item "1" and the educational inverse mode is displayed as an item "2", is displayed on the display unit 16 as illustrated in FIG. 9A or 9B (step T1).

In the inverse number mode selection screen M, if the [1] key is input (step T21 (Yes)), the mode data "1" is stored in the inverse number mode setting memory 22c, and the scientific inverse mode is set (step T31).

In addition, in the inverse number mode selection screen M, if the [2] key is input (step T22 (Yes)), the mode data "2" is stored in the inverse number mode setting memory 22c, and the educational inverse mode is set (step T32).

Further, if the scientific inverse mode is set (step T31), for example, as illustrated in FIGS. 10A to 14F, the scientific inverse mode mark [□→1/□] Ms is displayed in the state display area of the display unit 16. If the educational inverse mode is set (step T32), for example, as illustrated in FIGS.

15A to 17F, the educational inverse mode mark [Δ/□→□/Δ] Me is displayed in the state display area of the display unit 16 (step T4).

Mathematical Expression Display Control Function

If a key code corresponding to an input key is read to the input expression area 22d in response to a user's operation of the key input unit 11 (step S1), it is determined whether, based on the key code, the [1/□] (inverse number) key 13i is input (step S2), the 2D function key such as the [√□] (root) key, the [□/□] (fraction) key, or the [X□] (power) key is input (step S3), the cursor key 15 is input (step S5), a [Simp1/□] (÷ fraction simplification) key 13 si is input (step S7), other keys such as numerical value keys or arithmetic symbol keys are input (step S8 (No)), or the execution key such as the [Ans] or [=] key is input (step S8 (Yes)).

If it is determined that the 2D function key is input (step S3 (Yes)), a mathematical expression corresponding to the input 2D function is displayed on the display unit 16 in a two-dimensional natural display form (step S4).

If it is determined that other keys such as the numerical value keys or the arithmetic symbol keys are input (step S8 (No)), a number or a symbol corresponding to the input key is displayed on the display unit 16 (step S9).

If it is determined the cursor key 15 is input (step S5 (Yes)), the cursor Cu which is currently displayed on the display unit 16 is moved in a direction designated by the cursor key 15 (step S6).

In addition, if it is determined that the execution key such as the [Ans] or [=] key is input (step S8 (Yes)), in relation to a mathematical expression which is stored in the input expression area 22d and is displayed on the display unit 16 due to the series of key input processes (S1 to S9), the key code data stored in the input expression area 22d is read, and it is checked whether or not the key code data has no problem as a mathematical expression which is an operation target (step S10). In a case where it is determined that there is a problem in that an operation cannot be performed in the mathematical expression checking in step S10, display of a syntax error is performed.

If it is determined that the input mathematical expression has no problem, an operation process is performed (step S11), and data on an operation result is displayed on the display unit 16 (step S12).

Mathematical Expression Display Control Function: Scientific Inverse Mode Ms

FIGS. 10A to 10E are diagrams illustrating a display operation (first) based on a user's operation during an inverse number input response process in the scientific inverse mode Ms of the scientific electronic calculator 10.

Figure 10A:
FIGS. 10A to 10E are diagrams illustrating a display operation (first) based on a user's operation during the inverse number input response process in a scientific inverse mode Ms of the scientific electronic calculator.
Figure 10B:
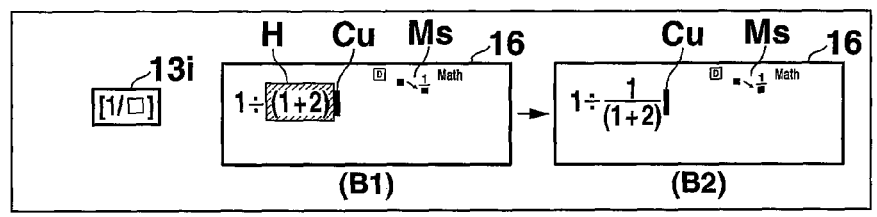

As illustrated in FIG. 10A, due to the series of key input processes (S1 to S9), a certain mathematical expression "1÷(1+2)" is input by a user, and the cursor Cu is located at the last part thereof and is displayed on the display unit 16. In this state, as illustrated in FIG. 10B, if the [1/□] (inverse number) key 13i is input (steps S1 and S2 (Yes)), the flow proceeds to an inverse number input response process (step SA).

When the inverse number input response process is performed, first, the flow proceeds to an inverse number function invalidation process (step AB), in which it is determined whether the cursor Cu is located between numerical values (in-numerical value) in the mathematical expression (step B1), there is any one of arithmetic symbols (+, −, x, and ÷) of four operations right in front of the cursor Cu (step B2), or the cursor Cu is located at a position where the multiplication symbol (x, or ·) is omitted (step B3).

Here, since it is determined the cursor Cu located at the last part of the mathematical expression "1÷(1+2)" illustrated in FIG. 10A is not located at the positions regarded as the conditions in the inverse number function invalidation process (steps B1 (No), B2 (No), and B3 (No)), the flow proceeds to a chunk region detection process (step SC).

On the other hand, if the cursor Cu on the input mathematical expression is located at any of the positions regarded as the conditions in the inverse number function invalidation process (step B1 (Yes), B2 (Yes), or B3 (Yes)), a subsequent inverse number input response process is invalidated, and the current display state is maintained without change, or a message indicating invalidity is displayed or an error sound is output (step B4).

If the flow proceeds to the chunk region detection process (step SC) through the inverse number function invalidation process (B1 (No), B2 (No), and B3 (No)) on the mathematical expression "1÷(1+2)" illustrated in FIG. 10A, the mathematical expression "1÷(1+2)" which is present in a reverse direction (front side) from the current position of the cursor Cu is read to the work area (expression buffer) 22f, and a recognition process of a chunk part of the mathematical expression starts in a reverse direction (front side) from the position of the cursor Cu (step C1).

First, the mathematical expression is traced back from the position of the cursor Cu, and a mathematical expression part from the right parenthesis ")" to the left parenthesis "(" (in this case, "(1+2)") is processed to be recognized as a chunk mathematical expression part (step C2).

In addition, similarly, the mathematical expression is traced back from the position of the cursor Cu, and a mathematical expression part from an end position to a leading position in a range to which a general function including a 2D function is applied (in a case of (B2) in FIG. 10B, "1/(1+2)") is processed to be recognized as a chunk mathematical expression part (step C3).

Figure 13A:
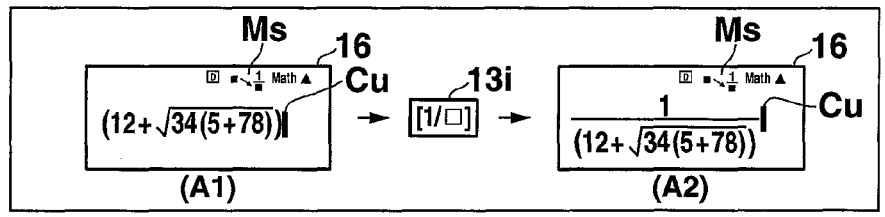
FIGS. 13A to 13F are diagrams illustrating a display operation (fourth) based on a user's operation during the inverse number input response process in the scientific inverse mode Ms of the scientific electronic calculator.
Figure 13B:
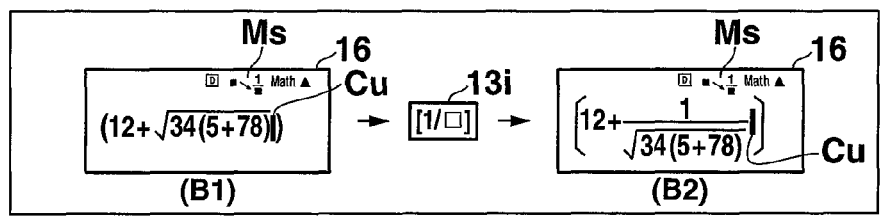
Figure 13C:
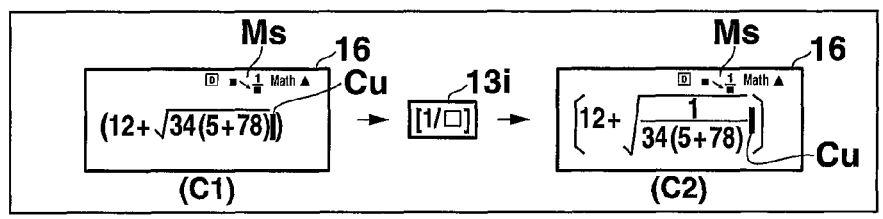
Figure 13D:
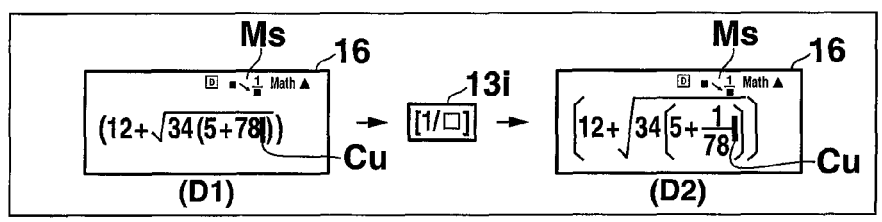

Further, similarly, the mathematical expression is traced back from the position of the cursor Cu, and mathematical expression parts of only a numerical value and only a character (in a case of (D1) in FIG. 13D, "78") are respectively processed to be recognized as chunk mathematical expression parts (step C4).

Furthermore, similarly, the mathematical expression is traced back from the position of the cursor Cu, and a mathematical expression par in a multiplication range where a multiplication symbol (x, or ·) is omitted (in a case of FIG. 12B, "2A") is processed to be recognized as a chunk mathematical expression part (step C5).

In addition, if it is determined that the mathematical expression is traced back, and there is an arithmetic symbol (+, −, x, ÷) (step C6 (Yes)), a mathematical expression part traced back just before reaching the arithmetic symbol (in this case, "(1+2)") is incorporated as a chunk region of the mathematical expression which is an inverse number conversion target so as to be processed (step C7).

On the other hand, if it is determined that the mathematical expression is traced back, and there is no arithmetic symbol (+, −, x, ÷) in step C6 (step C6 (No)), the entire mathematical expression part of the command area, that is, a mathematical expression part to the leading part read to the work area (expression buffer) 22f is incorporated as a chunk region of the mathematical expression which is an inverse number conversion target so as to be processed (step C8).

Then, as illustrated in (B1) of FIG. 10B, the chunk region "(1+2)" of the mathematical expression which is detected and processed to be incorporated in the chunk region detection process (step AC) has identification display H, for example, through blinking for one second, or the like, and thus the user is informed thereof as a mathematical expression part which is an inverse number conversion target (step A1).

In addition, if it is determined that the scientific inverse mode Ms is set according to the mode data "1" stored in the inverse number mode setting memory 22c (step A2 (Yes)), as illustrated in (B2) of FIG. 10B, a fraction "1/(1+2)" as an inverse number which has the detected chunk region "(1+2)" of the mathematical expression as a denominator and "1" as a numerator replaces the original mathematical expression part "(1+2)", and is displayed (step A3).

Figure 10C:
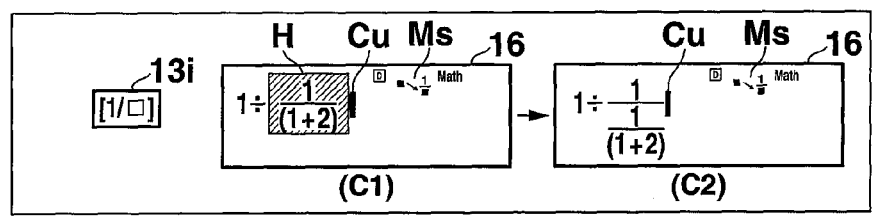

Subsequently to this state (refer to (B2) in FIG. 10B), as illustrated in FIG. 10C, when the [1/□] (inverse number) key 13i is input and thus the flow proceeds to the inverse number input response process (step SA), the chunk region "1/(1+2)" of the mathematical expression, which is processed to be incorporated through the inverse number function invalidation process (step AB: B1 (No), B2 (No), and B3 (No)) and the chunk region detection process (step AC; C1 to C7), has identification display H, as illustrated in (C1) of FIG. 10C, and the user is informed thereof as a mathematical expression part which is an inverse number conversion target (step A1).

In addition, if it is determined that the scientific inverse mode Ms is set (step A2 (Yes)), as illustrated in (C2) of FIG. 10C, a fraction "1/(1+(1+2))" as an inverse number which has the detected chunk region "1/(1+2)" of the mathematical expression as a denominator and "1" as a numerator replaces the original mathematical expression part "1/(1+2)" and is displayed (step A3).

Figure 10D:
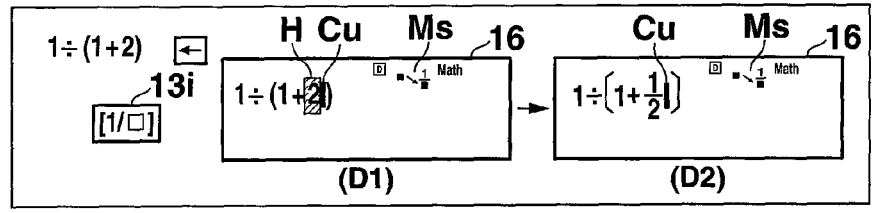

On the other hand, as illustrated in FIG. 10D, a certain mathematical expression "1÷(1+2)" is input by a user, and the cursor Cu is located between "2" and ")" and is displayed on the display unit 16. In this state, if the [1/□] (inverse number) key 13i is input and the flow proceeds to the inverse number input response process (step SA), the chunk region "2" of the mathematical expression, which is processed to be incorporated through the inverse number function invalidation process (step AB) and the chunk region detection process (step AC; C1 to C7), has identification display H, as illustrated in (D1) of FIG. 10D, and the user is informed thereof as a mathematical expression part which is an inverse number conversion target (step A1).

In addition, if it is determined that the scientific inverse mode Ms is set (step A2 (Yes)), as illustrated in (D2) of FIG. 10D, a fraction "½" as an inverse number which has the chunk region "2" as a denominator and "1" as a numerator replaces the original mathematical expression part "2" and is displayed (step A3).

Figure 10E:

In addition, as illustrated in FIG. 10E, in the mathematical expression "1÷(1+2)", the cursor Cu is located between "+" and "2" and is displayed on the display unit 16. In this state, if the [1/□] (inverse number) key 13i is input and the flow proceeds to the inverse number input response process (step SA), it is determined that there is an arithmetic symbol (+) of four operations right in front of the cursor Cu (step B2 (Yes)) in the inverse number function invalidation process (step AB).

Then, a subsequent inverse number input response process is invalidated, and the current display state is maintained without change, or a message indicating invalidity is displayed or an error sound is output (step B4).

FIGS. 11A to 11D are diagrams illustrating a display operation (second) based on a user's operation during the inverse number input response process in the scientific inverse mode Ms of the scientific electronic calculator 10.

Figure 11A:
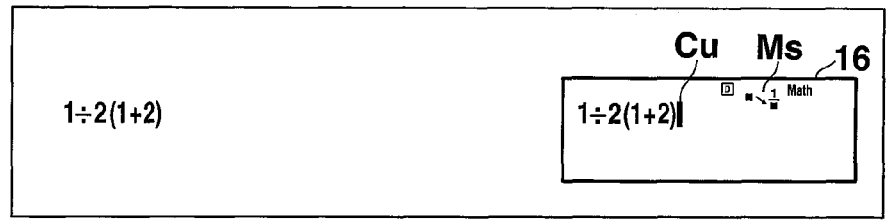
FIGS. 11A to 11D are diagrams illustrating a display operation (second) based on a user's operation during the inverse number input response process in the scientific inverse mode Ms of the scientific electronic calculator.

As illustrated in FIG. 11A, due to the series of key input processes (steps S1 to S9), a certain mathematical expression "1÷(1+2)" is input by the user, and the cursor Cu is located at the last part thereof and is displayed on the display unit 16. In this state, as illustrated in FIG. 11B, if the [1/□] (inverse number) key 13i is input (steps S1 and S2 (Yes)), the flow proceeds to an inverse number input response process (step SA).

Then, the chunk region "2(1+2)" of the mathematical expression, which is processed to be incorporated through the inverse number function invalidation process (step AB) and the chunk region detection process (step AC; C1 to C7), has identification display H, as illustrated in (B1) of FIG. 11B, and the user is informed thereof as a mathematical expression part which is an inverse number conversion target (step A1).

Figure 11B:
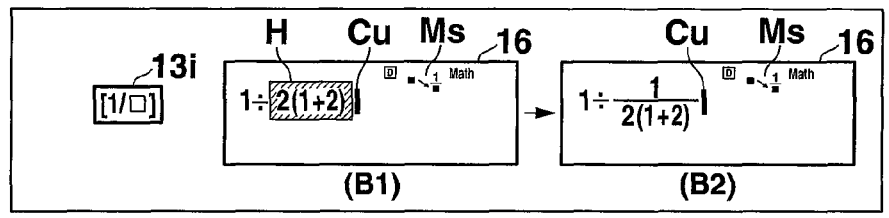

In addition, if it is determined that the scientific inverse mode Ms is set (step A2 (Yes)), as illustrated in (B2) of FIG. 11B, a fraction "½(1+2)" as an inverse number which has the chunk region "2(1+2)" as a denominator and "1" as a numerator replaces the original mathematical expression part "2(1+2)" and is displayed (step A3).

Figure 11C:
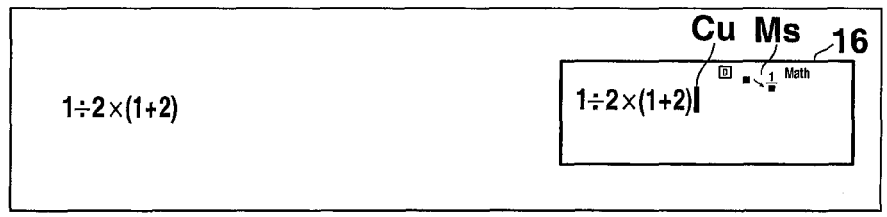

In addition, as illustrated in FIG. 11C, a certain mathematical expression "1÷2×(1+2)" is input by the user, and the cursor Cu is located at the last part thereof and is displayed on the display unit 16. In this state, as illustrated in FIG. 11D, if the [1/□] (inverse number) key 13i is input (steps S1 and S2 (Yes)), the flow proceeds to an inverse number input response process (step SA).

Then, the chunk region "(1+2)" of the mathematical expression, which is processed to be incorporated through the inverse number function invalidation process (step AB) and the chunk region detection process (step AC; C1 to C7), has identification display H, as illustrated in (D1) of FIG. 11D, and the user is informed thereof as a mathematical expression part which is an inverse number conversion target (step A1).

Figure 11D:
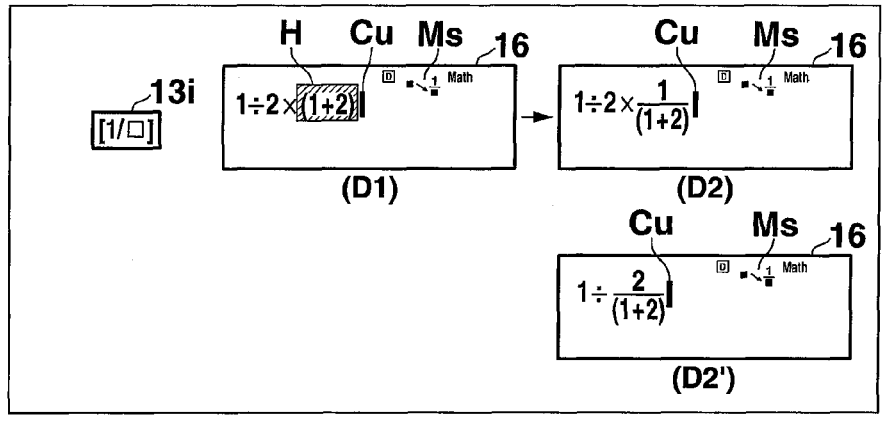

In addition, if it is determined that the scientific inverse mode Ms is set (step A2 (Yes)), as illustrated in (D2) of FIG. 11D, a fraction "1/(1+2)" as an inverse number which has the detected chunk region "(1+2)" as a denominator and "1" as a numerator replaces the original mathematical expression part "(1+2)" and is displayed (step A3).

In this case, a fraction "2/(1+2)" into which the mathematical expression part "2×" of multiplication right in front of the fraction "1/(1+2)" as an inverse number is incorporated as a numerator may be produced and displayed as illustrated in (D2') of FIG. 11D.

FIGS. 12A to 12D are diagrams illustrating a display operation (third) based on a user's operation during the inverse number input response process in the scientific inverse mode Ms of the scientific electronic calculator 10.

Figure 12A:
FIGS. 12A to 12F are diagrams illustrating a display operation (third) based on a user's operation during the inverse number input response process in the scientific inverse mode Ms of the scientific electronic calculator.

As illustrated in FIG. 12A, due to the series of key input processes (S1 to S9), a certain mathematical expression "1+2A" is input by the user, and the cursor Cu is located at the last part thereof and is displayed on the display unit 16. In this state, as illustrated in FIG. 12B, if the [1/□] (inverse number) key 13i is input (steps S1 and S2 (Yes)), the flow proceeds to an inverse number input response process (step SA).

Then, the chunk region "2A" of the mathematical expression, which is processed to be incorporated through the inverse number function invalidation process (step AB) and the chunk region detection process (step AC; C1 to C7), has identification display H, as illustrated in (B1) of FIG. 12B, and the user is informed thereof as a mathematical expression part which is an inverse number conversion target (step A1).

Figure 12B:
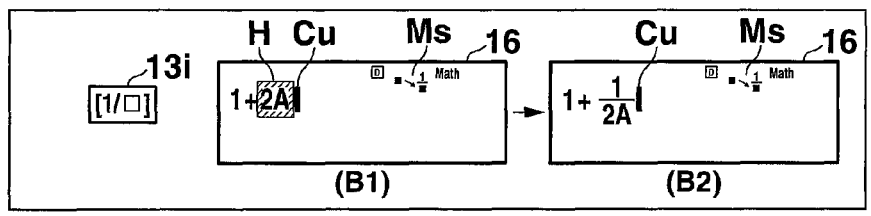

In addition, if it is determined that the scientific inverse mode Ms is set (step A2 (Yes)), as illustrated in (B2) of FIG. 12B, a fraction "½A" as an inverse number which has the detected chunk region "2A" and "1" as a numerator replaces the original mathematical expression part "2A" and is displayed (step A3).

Figure 12C:
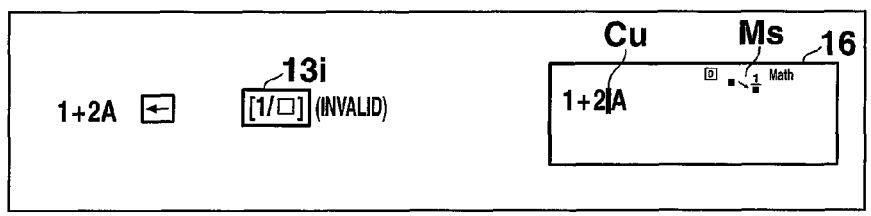

In addition, as illustrated in FIG. 12C, in the mathematical expression "1+2A", the cursor Cu is located between "2" and "A" and is displayed on the display unit 16. In this state, if the [1/□] (inverse number) key 13i is input and the flow proceeds to the inverse number input response process (step SA), it is determined that the cursor Cu is located at a position where the multiplication symbol (×, or ·) is omitted (step B3 (Yes)) in the inverse number function invalidation process (step AB).

Then, a subsequent inverse number input response process is invalidated, and the current display state is maintained without change, or a message indicating invalidity is displayed or an error sound is output (step B4).

Figure 12D:
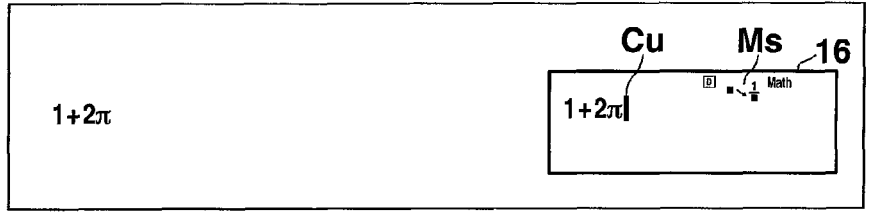

In addition, as illustrated in FIG. 12D, a certain mathematical expression "1+2π" is input by the user, and the cursor Cu is located at the last part thereof and is displayed on the display unit 16. In this state, as illustrated in FIG. 12E, if the [1/□] (inverse number) key 13i is input (steps S1 and S2 (Yes)), the flow proceeds to an inverse number input response process (step SA).

Then, the chunk region "2π" of the mathematical expression, which is processed to be incorporated through the inverse number function invalidation process (step AB) and the chunk region detection process (step AC; C1 to C7), has identification display H, as illustrated in (E1) of FIG. 12E, and the user is informed thereof as a mathematical expression part which is an inverse number conversion target (step A1).

Figure 12E:
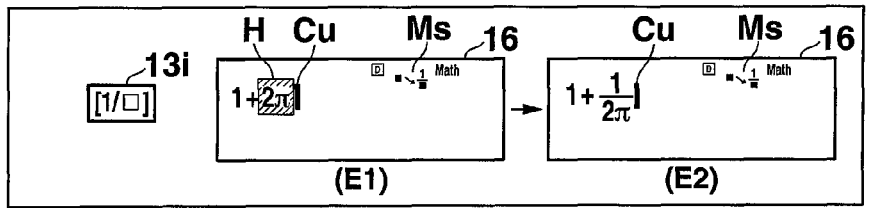

In addition, if it is determined that the scientific inverse mode Ms is set (step A2 (Yes)), as illustrated in (E2) of FIG. 12E, a fraction "½π" as an inverse number which has the detected chunk region "2π" as a denominator and "1" as a numerator replaces the original mathematical expression part "2π" and is displayed (step A3).

Figure 12F:
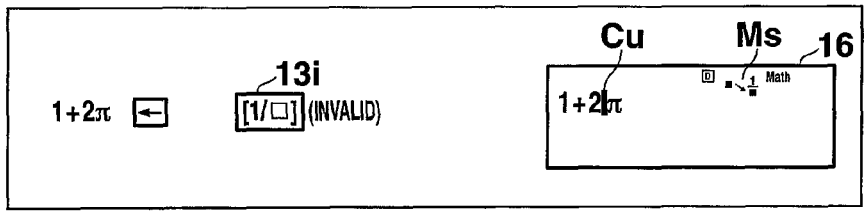

In addition, as illustrated in FIG. 12F, in the mathematical expression "1+2π", the cursor Cu is located between "2" and "π" and is displayed on the display unit 16. In this state, if the [1/□] (inverse number) key 13i is input and the flow proceeds to the inverse number input response process (step SA), it is determined that the cursor Cu is located at a position where the multiplication symbol (×, or ·) is omitted (step B3 (Yes)) in the inverse number function invalidation process (step AB).

Then, a subsequent inverse number input response process is invalidated, and the current display state is maintained without change, or a message indicating invalidity is displayed or an error sound is output (step B4).

FIGS. 13A to 13F are diagrams illustrating a display operation (fourth) based on a user's operation during the inverse number input response process in the scientific inverse mode Ms of the scientific electronic calculator 10.

FIGS. 14A to 14F are diagrams illustrating a display operation (fifth) based on a user's operation during the inverse number input response process in the scientific inverse mode Ms of the scientific electronic calculator 10.

As illustrated in (A1) of FIG. 13A, a certain mathematical expression "(12+√{34(5+78)})" is input by a user, and the cursor Cu is located at the last part thereof and is displayed on the display unit 16. In this state, if the [1/□] (inverse number) key 13i is input and the flow proceeds to the inverse number input response process (step SA), the chunk region "(12+√{34(5+78)})" of the mathematical expression, which is processed to be incorporated through the inverse number function invalidation process (step AB) and the chunk region detection process (step AC; C1 to C6 (No)→C8), has identification display, and the user is informed thereof as a mathematical expression part which is an inverse number conversion target (step A1). Additionally, a mathematical expression part inside "√" is naturally displayed by using an overline hereinafter, as shown in FIG. 13A1. Further, since it is difficult to describe a mathematical expression part by using an overline in the specification, explanations hereinafter in the specification adopt a way such that a mathematical expression part inside "√" is displayed by using left and right curly brackets by sandwiching said mathematical expression part between the left and right curly brackets.

In addition, if it is determined that the scientific inverse mode Ms is set (step A2 (Yes)), as illustrated in (A2) of FIG. 13A, a fraction "1/(12+√{34(5+78)})" as an inverse number which has the chunk region "(12+√{34(5+78)})" as a denominator and "1" as a numerator replaces the original mathematical expression part "(12+√{34(5+78)})" and is displayed (step A3).

In addition, as illustrated in (B1) of FIG. 13B, in the mathematical expression "(12+√{34(5+78)})", the cursor Cu is located between the root range "√{34(5+78)}" and the last closing parenthesis ")" and is displayed on the display unit 16. In this state, if the [1/□] (inverse number) key 13i is input and the flow proceeds to the inverse number input response process (step SA), the chunk region "√{34(5+78)}" of the mathematical expression, which is processed to be incorporated through the inverse number function invalidation process (step AB) and the chunk region detection process (step AC; C1 to C7), has identification display, and the user is informed thereof as a mathematical expression part which is an inverse number conversion target (step A1).

Further, if it is determined that the scientific inverse mode Ms is set (step A2 (Yes)), as illustrated in (B2) of FIG. 13B, a fraction "1/√{34(5+78)}" as an inverse number which has the chunk region "√{34(5+78)}" as a denominator and "1" as a numerator replaces the original mathematical expression part "√{34(5+78)}" and is displayed (step A3).

In addition, as illustrated in (C1) of FIG. 13C, in the mathematical expression "(12+√{34(5+78)})", the cursor Cu is located at the last part of the root range "√{34(5+78)}" and is displayed on the display unit 16. In this state, if the [1/□] (inverse number) key 13i is input and the flow proceeds to the inverse number input response process (step SA), the chunk region "34(5+78)" of the mathematical expression, which is processed to be incorporated through the inverse number function invalidation process (step AB) and the chunk region detection process (step AC; C1 to C6 (No)→C8), has identification display, and the user is informed thereof as a mathematical expression part which is an inverse number conversion target (step A1).

In addition, if it is determined that the scientific inverse mode Ms is set (step A2 (Yes)), as illustrated in (C2) of FIG. 13C, a fraction "1/{34(5+78)}" as an inverse number which has the chunk region "{34(5+78)}" as a denominator and "1" as a numerator replaces the original mathematical expression part "{34(5+78)}" and is displayed (step A3).

In addition, as illustrated in (D1) of FIG. 13D, in the mathematical expression "(12+√{34(5+78)})", the cursor Cu is located between "78" and ")" in the root range "√{34(5+78)}" and is displayed on the display unit 16. In this state, if the [1/□] (inverse number) key 13i is input and the flow proceeds to the inverse number input response process (step SA), the chunk region "78" of the mathematical expression, which is processed to be incorporated through the inverse number function invalidation process (step AB) and the chunk region detection process (step AC; C1 to C7), has identification display, and the user is informed thereof as a mathematical expression part which is an inverse number conversion target (step A1).

Further, if it is determined that the scientific inverse mode Ms is set (step A2 (Yes)), as illustrated in (D2) of FIG. 13D, a fraction "⅟78" as an inverse number which has the chunk region "78" as a denominator and "1" as a numerator replaces the original mathematical expression part "78" and is displayed (step A3).

Figure 13E:
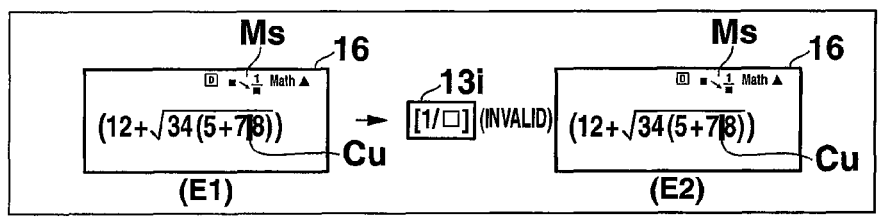

In addition, as illustrated in (E1) of FIG. 13E, in the mathematical expression "(12+√{34(5+78)})", the cursor Cu is located between "7" and "8" in the root range "√{34(5+78)}" and is displayed on the display unit 16. In this state, if the [1/□] (inverse number) key 13i is input and the flow proceeds to the inverse number input response process (step SA), it is determined that the cursor Cu is located between numerical values in the mathematical expression (step B1 (Yes)) in the inverse number function invalidation process (step AB).

Then, a subsequent inverse number input response process is invalidated, and the current display state is maintained without change, or a message indicating invalidity is displayed or an error sound is output as illustrated in (E2) of FIG. 13E (step B4).

Figure 13F:
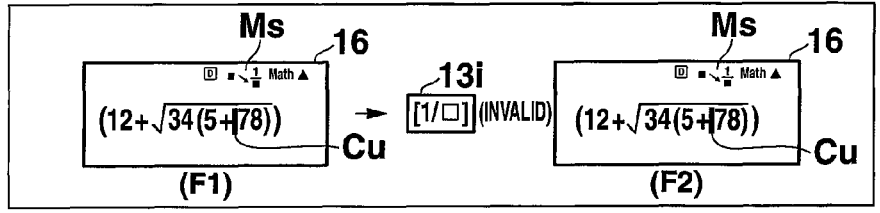

In addition, as illustrated in (F1) of FIG. 13F, in the mathematical expression "(12+√{34(5+78)})", the cursor Cu is located between "+" and "7" in the root range "√{34(5+78)}" and is displayed on the display unit 16. In this state, if the [1/□] (inverse number) key 13i is input and the flow proceeds to the inverse number input response process (step SA), it is determined that there is an arithmetic symbol (+) of four operations right in front of the cursor Cu (step B2 (Yes)) in the inverse number function invalidation process (step AB).

Then, a subsequent inverse number input response process is invalidated, and the current display state is maintained without change, or a message indicating invalidity is displayed or an error sound is output as illustrated in (F2) of FIG. 13F (step B4).

Figure 14A:
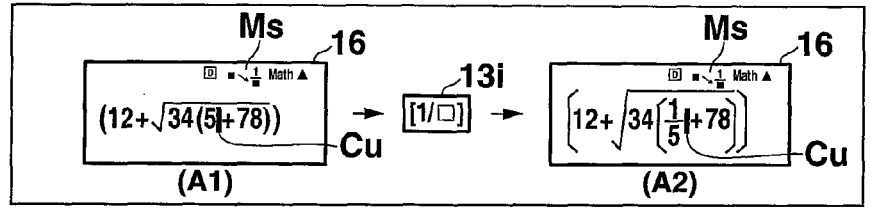
FIGS. 14A to 14F are diagrams illustrating a display operation (fifth) based on a user's operation during the inverse number input response process in the scientific inverse mode Ms of the scientific electronic calculator.

In addition, as illustrated in (A1) of FIG. 14A, in the mathematical expression "(12+√{34(5+78)})", the cursor Cu is located between "5" and "+" in the root range "√{34(5+78)}" and is displayed on the display unit 16. In this state, if the [1/□] (inverse number) key 13i is input and the flow proceeds to the inverse number input response process (step SA), the chunk region "5" of the mathematical expression, which is processed to be incorporated through the inverse number function invalidation process (step AB) and the chunk region detection process (step AC; C1 to C6 (No) →C8), has identification display, and the user is informed thereof as a mathematical expression part which is an inverse number conversion target (step A1).

Further, if it is determined that the scientific inverse mode Ms is set (step A2 (Yes)), as illustrated in (A2) of FIG. 14A, a fraction "⅕" as an inverse number which has the chunk region "5" as a denominator and "1" as a numerator replaces the original mathematical expression part "5" and is displayed (step A3).

Figure 14B:
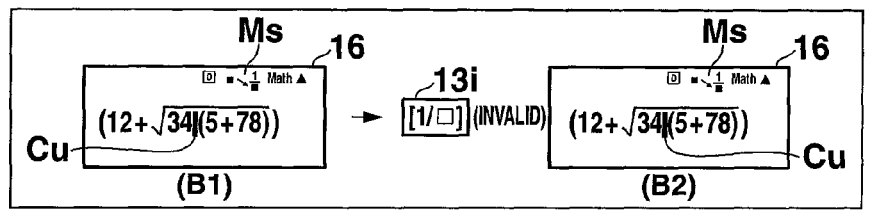

In addition, as illustrated in (B1) of FIG. 14B, in the mathematical expression "(12+√{34(5+78)})", the cursor Cu is located between "34" and "(" in the root range "√{34(5+78)}" and is displayed on the display unit 16. In this state, if the [1/□] (inverse number) key 13i is input and the flow proceeds to the inverse number input response process (step SA), it is determined that the cursor Cu is located at a position where the multiplication symbol (×, or ·) is omitted (step B3 (Yes)) in the inverse number function invalidation process (step AB).

Then, a subsequent inverse number input response process is invalidated, and the current display state is maintained without change, or a message indicating invalidity is displayed or an error sound is output as illustrated in (B2) of FIG. 14B (step B4).

Figure 14C:
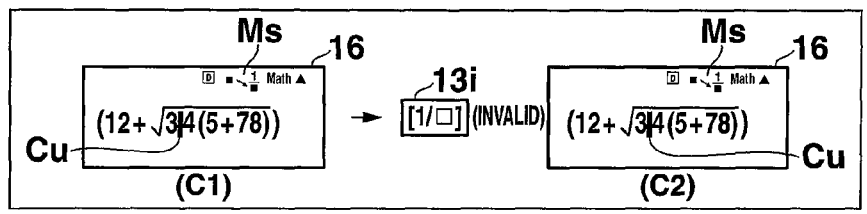

In addition, as illustrated in (C1) of FIG. 14C, in the mathematical expression "(12+√{34(5+78)})", the cursor Cu is located between "3" and "4" in the root range "√{34(5+78)}" and is displayed on the display unit 16. In this state, if the [1/□] (inverse number) key 13i is input and the flow proceeds to the inverse number input response process (step SA), it is determined that the cursor Cu is located between numerical values in the mathematical expression (step B1 (Yes)) in the inverse number function invalidation process (step AB).

Then, a subsequent inverse number input response process is invalidated, and the current display state is maintained without change, or a message indicating invalidity is displayed or an error sound is output as illustrated in (C2) of FIG. 14C (step B4).

Figure 14D:
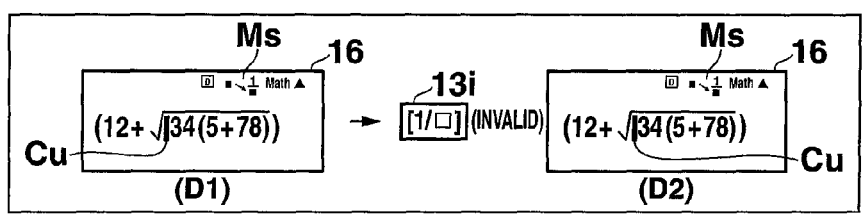

In addition, as illustrated in (D1) of FIG. 14D, in the mathematical expression "(12+√{34(5+78)})", the cursor Cu is located between "√" and "3" in the root range "√{34(5+78)}" and is displayed on the display unit 16. In this state, if the [1/□] (inverse number) key 13i is input and the flow proceeds to the inverse number input response process (step SA), it is determined that the cursor Cu is located at a position where the multiplication symbol (×, or ·) is omitted (step B3 (Yes)) in the inverse number function invalidation process (step AB).

Then, a subsequent inverse number input response process is invalidated, and the current display state is maintained without change, or a message indicating invalidity is displayed or an error sound is output as illustrated in (D2) of FIG. 14D (step B4).

Figure 14E:
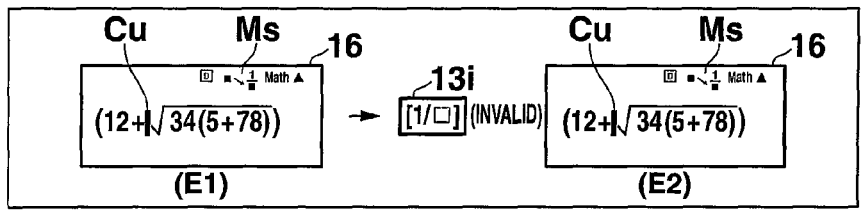

In addition, as illustrated in (E1) of FIG. 14E, in the mathematical expression "(12+√{34(5+78)})", the cursor Cu is located between "+" out of the root range and "√" and is displayed on the display unit 16. In this state, if the [1/□] (inverse number) key 13i is input and the flow proceeds to the inverse number input response process (step SA), it is determined that there is an arithmetic symbol (+) of four operations right in front of the cursor Cu (step B2 (Yes)) in the inverse number function invalidation process (step AB).

Then, a subsequent inverse number input response process is invalidated, and the current display state is maintained without change, or a message indicating invalidity is displayed or an error sound is output as illustrated in (E2) of FIG. 14E (step B4).

Figure 14F:
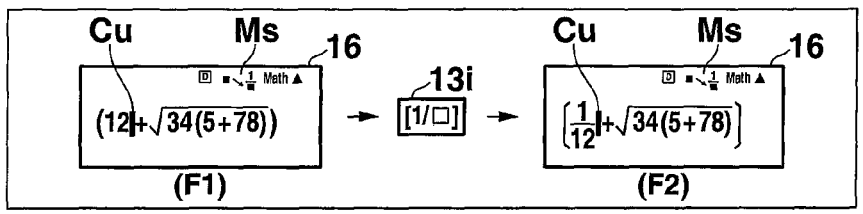

In addition, as illustrated in (F1) of FIG. 14F, in the mathematical expression "(12+√{34(5+78)})", the cursor Cu is located between "12" and "+" out of the root range and is displayed on the display unit 16. In this state, if the [1/□] (inverse number) key 13i is input and the flow proceeds to the inverse number input response process (step SA), the chunk region "12" of the mathematical expression, which is processed to be incorporated through the inverse number function invalidation process (step AB) and the chunk region detection process (step AC; C1 to C6 (No)→C8), has identification display, and the user is informed thereof as a mathematical expression part which is an inverse number conversion target (step A1).

Further, if it is determined that the scientific inverse mode Ms is set (step A2 (Yes)), a fraction "1/12" as an inverse number which has the chunk region "12" as a denominator and "1" as a numerator replaces the original mathematical expression part "12" and is displayed as illustrated in (F2) of FIG. 14F (step A3).

Mathematical Expression Display Control Function: Educational Inverse Mode Me

FIGS. 15A to 15G are diagrams illustrating a display operation (first) based on a user's operation during the inverse number input response process in an educational inverse mode Me of the scientific electronic calculator 10.

Figure 15A:
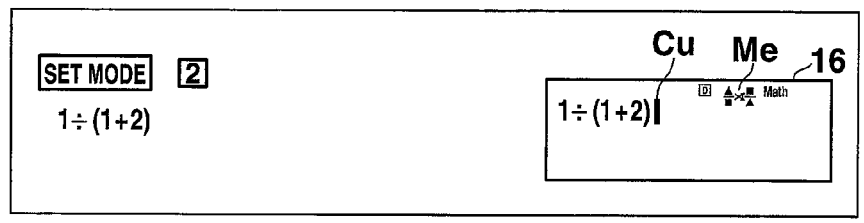
FIGS. 15A to 15G are diagrams illustrating a display operation (first) based on a user's operation during the inverse number input response process in an educational inverse mode Me of the scientific electronic calculator.

As illustrated in FIG. 15A, after the educational inverse mode Me is set due to the inverse number mode setting process (refer to FIG. 4), a certain mathematical expression "1÷(1+2)" is input by the user, and the cursor Cu is located at the last part thereof and is displayed on the display unit 16. In this state, as illustrated in FIG. 15B, if the [1/□] (inverse number) key 13i is input (steps S1 and S2 (Yes)), the flow proceeds to an inverse number input response process (step SA).

Then, the chunk region "(1+2)" of the mathematical expression, which is processed to be incorporated through the inverse number function invalidation process (step AB) and the chunk region detection process (step AC; C1 to C7), has identification display H, as illustrated in (B1) of FIG. 15B, and the user is informed thereof as a mathematical expression part which is an inverse number conversion target (step A1).

Figure 15B:
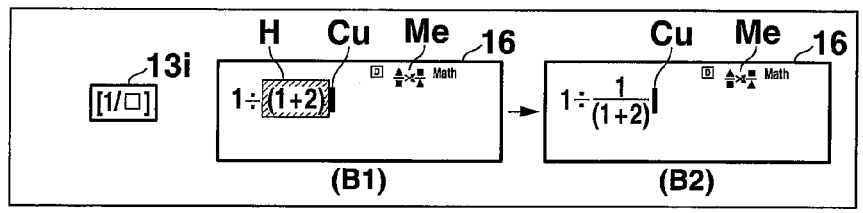

In addition, if it is determined that the educational inverse mode Me is set (step A2 (No)), it is determined that the chunk region "(1+2)" is neither a fraction (step A4 (No)) nor a decimal (step A6 (No)), and, as illustrated in (B2) of FIG. 15B, a fraction "1/(1+2)" as an inverse number which has the chunk region "(1+2)" as a denominator and "1" as a numerator replaces the original mathematical expression part "(1+2)" and is displayed (step A3).

Figure 15C:
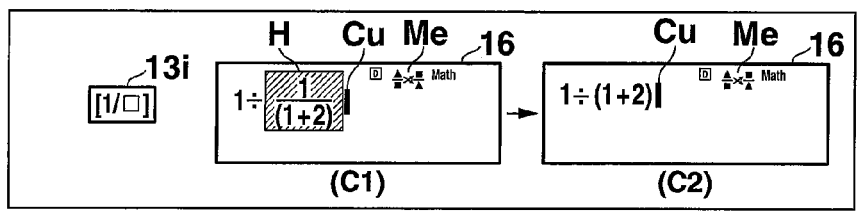

Subsequently to this state (refer to (B2) in FIG. 15B, as illustrated in FIG. 15C, when the [1/□] (inverse number) key 13i is input and thus the flow proceeds to the inverse number input response process (step SA), the chunk region "1/(1+2)" of the mathematical expression, which is processed to be incorporated through the inverse number function invalidation process (step AB) and the chunk region detection process (step AC; C1 to C7), has identification display H, as illustrated in (C1) of FIG. 15C, and the user is informed thereof as a mathematical expression part which is an inverse number conversion target (step A1).

In addition, if it is determined that the educational inverse mode Me is set (step A2 (No)), it is determined that the chunk region "1/(1+2)" is a fraction (step A4 (Yes)), and, as illustrated in (C2) of FIG. 15C, a fraction "(1+2)/1" as an inverse number which is obtained by replacing the denominator and the numerator of the chunk region "1/(1+2)" with each other replaces the original mathematical expression part "1/(1+2)" and is displayed (step A5).

In addition, here, the fraction "X/1" whose denominator is "1" is displayed as an integer "X".

Figure 15D:
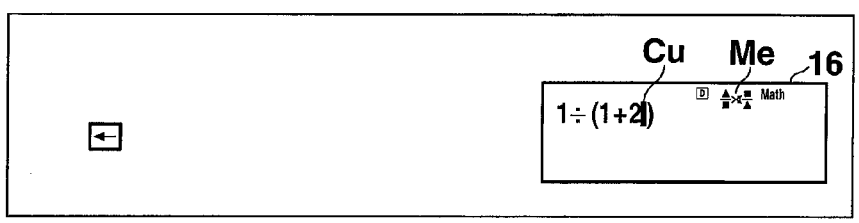
Figure 15E:
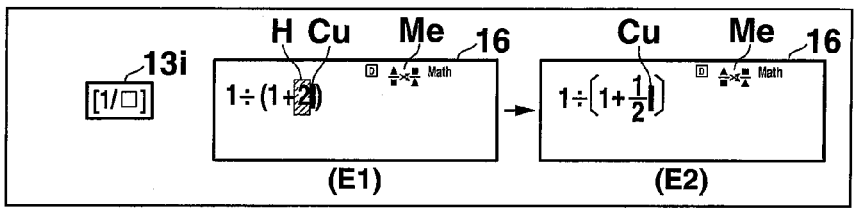

Next, as illustrated in FIG. 15D, in the mathematical expression "1÷(1+2)", the cursor Cu is located between "2" and ")" and is displayed on the display unit 16. In this state, as illustrated in FIG. 15E, if the [1/□] (inverse number) key 13i is input and the flow proceeds to the inverse number input response process (step SA), the chunk region "2" of the mathematical expression, which is processed to be incorporated through the inverse number function invalidation process (step AB) and the chunk region detection process (step AC; C1 to C7), has identification display H, as illustrated in (E1) of FIG. 15E, and the user is informed thereof as a mathematical expression part which is an inverse number conversion target (step A1).

In addition, if it is determined that the educational inverse mode Me is set (step A2 (No)), it is determined that the chunk region "2" is neither of a fraction (step A4 (No)) and a decimal (step A6 (No)), and, as illustrated in (E2) of FIG. 15E, a fraction "½" as an inverse number which has the chunk region "2" as a denominator and "1" as a numerator replaces the original mathematical expression part "2" and is displayed (step A3).

Figure 15F:
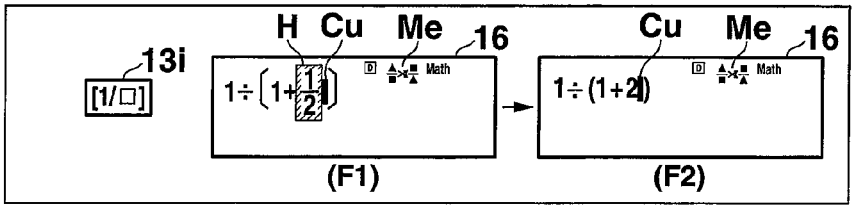

Subsequently to this state (refer to (E2) in FIG. 15E), as illustrated in FIG. 15F, when the [1/□] (inverse number) key 13i is input and thus the flow proceeds to the inverse number input response process (step SA), the chunk region "½" of the mathematical expression, which is processed to be incorporated through the inverse number function invalidation process (step AB) and the chunk region detection process (step AC; C1 to C7), has identification display H, as illustrated in (F1) of FIG. 15F, and the user is informed thereof as a mathematical expression part which is an inverse number conversion target (step A1).

In addition, if it is determined that the educational inverse mode Me is set (step A2 (No)), it is determined that the chunk region "½" is a fraction (step A4 (Yes)), and, as illustrated in (F2) of FIG. 15F, a fraction "2/1" (displayed as the integer "2") as an inverse number which is obtained by replacing the denominator and the numerator of the chunk region "½" with each other replaces the original mathematical expression part "½" and is displayed (step A5).

Figure 15G:

Next, as illustrated in FIG. 15G, in the mathematical expression "1÷(1+2)", the cursor Cu is located between "+" and "2" and is displayed on the display unit 16. In this state, if the [1/□] (inverse number) key 13i is input and the flow proceeds to the inverse number input response process (step SA), it is determined that there is an arithmetic symbol (+) of four operations right in front of the cursor Cu (step B2 (Yes)) in the inverse number function invalidation process (step AB).

Then, a subsequent inverse number input response process is invalidated, and the current display state is maintained without change, or a message indicating invalidity is displayed or an error sound is output (step B4).

FIGS. 16A to 16F are diagrams illustrating a display operation (second) based on a user's operation during the inverse number input response process in an educational inverse mode Me of the scientific electronic calculator 10.

Figure 16A:
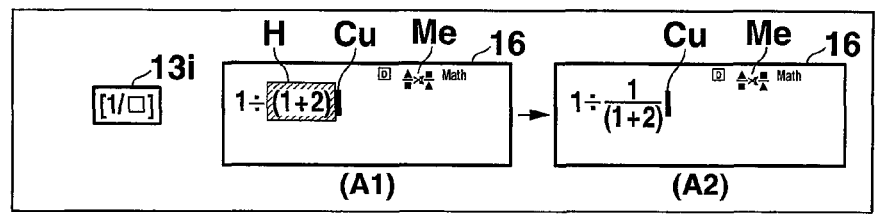
FIGS. 16A to 16F are diagrams illustrating a display operation (second) based on a user's operation during the inverse number input response process in the educational inverse mode Me of the scientific electronic calculator.
Figure 16B:
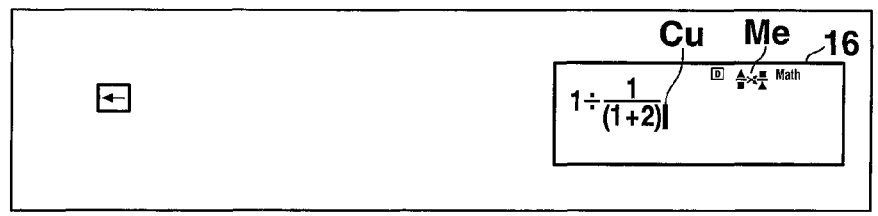

In the same manner as illustrated in FIG. 15B, as illustrated in FIG. 16A, in relation to the mathematical expression "1÷(1+2)", in a state in which the chunk region "(1+2)" of the mathematical expression, which is processed to be incorporated through the inverse number function invalidation process (step AB) and the chunk region detection process (step AC; C1 to C7), is replaced with a fraction "1/(1+2)" as an inverse number (steps A1, A2 (No)→A4 (No)→A6 (No)→A3), as illustrated in FIG. 16B, the cursor Cu is located at the last part of the denominator "(1+2)".

Figure 16C:
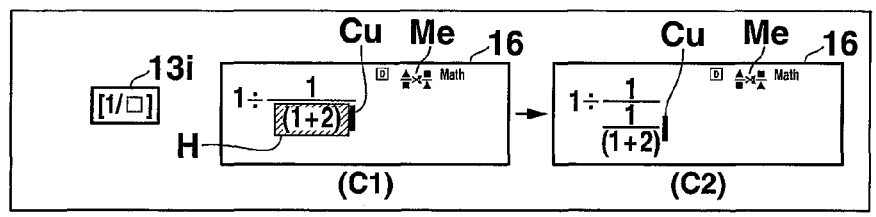

Here, as illustrated in FIG. 16C, when the [1/□] (inverse number) key 13i is input and thus the flow proceeds to the inverse number input response process (step SA), the chunk region "(1+2)" of the mathematical expression, which is processed to be incorporated through the inverse number function invalidation process (step AB) and the chunk region detection process (step AC; C1 to C6 (No)→C8), has identification display H, as illustrated in (C1) of FIG. 16C, and the user is informed thereof as a mathematical expression part which is an inverse number conversion target (step A1).

In addition, if it is determined that the educational inverse mode Me is set (step A2 (No)), it is determined that the chunk region "(1+2)" is neither of a fraction (step A4 (No)) and a decimal (step A6 (No)), and, as illustrated in (C2) of FIG. 16C, a fraction "1/(1+2)" as an inverse number which has the chunk region "(1+2)" as a denominator and "1" as a numerator replaces the original mathematical expression part "(1+2)" and is displayed (step A3).

Figure 16D:
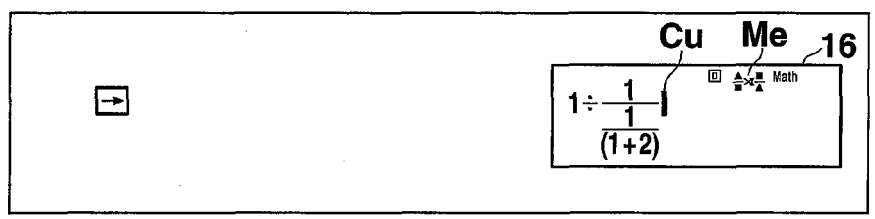
Figure 16E:
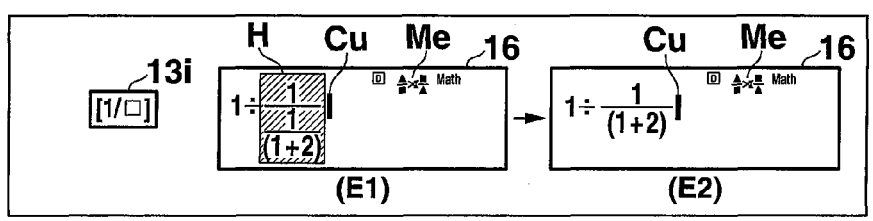

Subsequently, in a state in which the cursor Cu is located at the last part of the mathematical expression "1÷1/(1/(1+2))" as illustrated in FIG. 16D, when the [1/□] (inverse number) key 13i is input and thus the flow proceeds to the inverse number input response process (step SA) as illustrated in FIG. 16E, the chunk region "1/(1/(1+2))" of the mathematical expression, which is processed to be incorporated through the inverse number function invalidation process (step AB) and the chunk region detection process (step AC; C1 to C7), has identification display H, as illustrated in (E1) of FIG. 16E, and the user is informed thereof as a mathematical expression part which is an inverse number conversion target (step A1).

In addition, if it is determined that the educational inverse mode Me is set (step A2 (No)), it is determined that the chunk region "1(1/(1+2))" is a fraction (step A4 (Yes)), and, as illustrated in (E2) of FIG. 16E, a fraction "(1/(1+2))/1"→"1/(1+2)" as an inverse number which is obtained by replacing the denominator and the numerator of the chunk region "1/(1/(1+2))" with each other replaces the original mathematical expression part "1/(1/(1+2))" and is displayed (step A5).

Figure 16F:
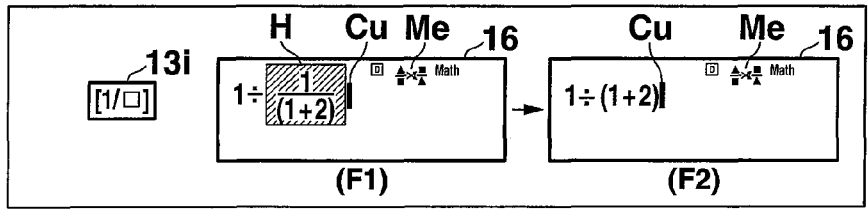

Subsequently to this state, as illustrated in FIG. 16F, when the [1/□] (inverse number) key 13$i$ is input and thus the flow proceeds to the inverse number input response process (step SA), the chunk region "1/(1+2)" of the mathematical expression, which is processed to be incorporated through the inverse number function invalidation process (step AB) and the chunk region detection process (step AC; C1 to C7), has identification display H, as illustrated in (F1) of FIG. 16F, and the user is informed thereof as a mathematical expression part which is an inverse number conversion target (step A1).

In addition, if it is determined that the educational inverse mode Me is set (step A2 (No)), it is determined that the chunk region "1/(1+2)" is a fraction (step A4 (Yes)), and, as illustrated in (F2) of FIG. 16F, a fraction "(1+2)/1" (displayed as the integer "1+2") as an inverse number which is obtained by replacing the denominator and the numerator of the chunk region "1/(1+2)" with each other replaces the original mathematical expression part "1/(1+2)" and is displayed (step A5).

FIGS. 17A to 17F are diagrams illustrating a display operation (third) based on a user's operation during the inverse number input response process in an educational inverse mode Me of the scientific electronic calculator 10.

As illustrated in FIG. 17A, a certain mathematical expression "2+0.5" is input by the user, and the cursor Cu is located at the last part thereof and is displayed on the display unit 16. In this state, as illustrated in FIG. 17B, if the [1/□] (inverse number) key 13$i$ is input (steps S1 and S2 (Yes)), the flow proceeds to an inverse number input response process (step SA).

Then, the chunk region "0.5" of the mathematical expression, which is processed to be incorporated through the inverse number function invalidation process (step AB) and the chunk region detection process (step AC; C1 to C7), has identification display H, as illustrated in (B1) of FIG. 17B, and the user is informed thereof as a mathematical expression part which is an inverse number conversion target (step A1).

In addition, if it is determined that the educational inverse mode Me is set (step A2 (No)), it is determined that the chunk region "0.5" is a decimal (step A6 (Yes)), and, as illustrated in (B2) of FIG. 17B, the chunk region "0.5" is converted into a fraction "½" and has identification display H (step A7). Then, as illustrated in (B3) of FIG. 17B, a fraction "²/₁" (displayed as an integer "2") as an inverse number which is obtained by replacing the denominator and the numerator of the fraction-converted chunk region "½" with each other replaces the original mathematical expression part "½" and is displayed (step A5).

In addition, as illustrated in FIG. 17C, in the same manner for a case where the cursor Cu is located at the last part of a mathematical expression "2+0.75", and, in this state, the [1/□] (inverse number) key 13$i$ is input, the chunk region "0.75" of the mathematical expression, which is processed to be incorporated through the inverse number function invalidation process (step AB) and the chunk region detection process (step AC), has identification display H, as illustrated in (D1) of FIG. 17D, and the user is informed thereof as a mathematical expression part which is an inverse number conversion target (step A1).

In addition, it is determined that the chunk region "0.75" is a decimal (step A6 (Yes)), and, as illustrated in (D2) of FIG. 17D, the chunk region "0.75" is converted into a fraction "¾" and has identification display H (step A7). Then, as illustrated in (D3) of FIG. 17D, a fraction "⁴⁄₃" as an inverse number which is obtained by replacing the denominator and the numerator of the fraction-converted chunk region "¾" with each other replaces the original mathematical expression part "¾" and is displayed (step A5).

In addition, as illustrated in FIG. 17E, in a state in which the cursor Cu is located at the last part of a mathematical expression "(2+0.75)", and is displayed on the display unit 16, when the [1/□] (inverse number) key 13$i$ is input as illustrated in FIG. 17F, the chunk region "(2+0.75)" of the mathematical expression, which is processed to be incorporated through the inverse number function invalidation process (step AB) and the chunk region detection process (step AC; C1 to C6 (No) →C8), has identification display H, as illustrated in (F1) of FIG. 17F, and the user is informed thereof as a mathematical expression part which is an inverse number conversion target (step A1).

In addition, if it is determined that the educational inverse mode Me is set (step A2 (No)), it is determined that the chunk region "(2+0.75)" is neither of a fraction (step A4 (No)) and a decimal (step A6 (No)), and, as illustrated in (F2) of FIG. 17F, a fraction "1/(2+0.75)" as an inverse number which has the chunk region "(2+0.75)" as a denominator and "1" as a numerator replaces the original mathematical expression part "(2+0.75)" and is displayed (step A3).

Mathematical Expression Display Control Function: Simplification of Fraction Calculation Using Inverse Number FIG. 18 is a flowchart illustrating a fraction calculation simplifying process using an inverse number performed in the mathematical expression display control process of the scientific electronic calculator 10.

FIGS. 19A and 19B are diagrams a display operation based on a user's operation during the fraction calculation simplifying process using an inverse number of the scientific electronic calculator 10.

As illustrated in FIG. 19A, for example, a certain mathematical expression "(⅗)÷(⅔)" which corresponds to division between fractions is input by a user, and the cursor Cu is located at the last part thereof and is displayed on the display unit 16. In this state, as illustrated in FIG. 19B, the [Simp1/□] (÷fraction simplification) key 13$si$ is input (steps S1 and S7 (Yes)), the flow proceeds to a fraction calculation simplifying process (step SP).

In the fraction calculation simplifying process, it is determined whether or not there is "÷fraction" right in front of the cursor Cu (step P1).

Here, if it is determined that, in the mathematical expression "(⅗)÷(⅔)", the mathematical expression part "÷(⅔)" which is "÷fraction" is right in front of the cursor Cu (step P1 (Yes)), the mathematical expression part "÷(⅔)" which is "÷fraction" has identification display H as illustrated in (B1) of FIG. 19B, and then "×fraction", "×(³⁄₂)" which is obtained by replacing the denominator and the numerator thereof each other replaces the mathematical expression part "÷(⅔)" which is "÷fraction" and is displayed as illustrated in (B2) of FIG. 19B (step P2).

In addition, when the [Simp1/☐] (÷fraction simplification) key 13si is input, and thus the flow proceeds to the fraction calculation simplifying process, if it is determined that "÷fraction" is not right in front of the cursor Cu (step P1 (No)), a message indicating that the fraction calculation simplifying function using an inverse number is invalidated is displayed or an error sound is output (step P3).

Therefore, according to the mathematical expression display control function of the scientific electronic calculator 10 with the configuration, when the cursor Cu is displayed at any position of a mathematical expression which is input by a user and is displayed, and the [1/☐] (inverse number) key 13i is input, a chunk region of the mathematical expression which is an inverse number target in a reverse direction from the cursor Cu is a parenthesis chunk region, a function chunk region, or a multiplication-omitted chunk region. In addition, a chunk region just before reaching symbols of four operations, or a region up to a leading part of the mathematical expression which is the chunk region is detected as a section. In addition, a fraction as an inverse number which has the detected chunk region of the mathematical expression as a denominator and "1" as a numerator replaces the detected chunk region.

For this reason, mathematical expression display can be performed in keeping with learning of an inverse number of elementary and middle school students, and thus it is possible to learn calculation regarding an inverse number in association with a fraction.

In addition, ca the mathematical expression display control function of the scientific electronic calculator 10 with the configuration, when the [1/☐] (inverse number) key 13i is input, in a case where it is determined that the cursor Cu is located between numerical values (in-numerical value) in a mathematical expression, there is any one of arithmetic symbols (+, −, ×, and ÷) of four operations right in front of the cursor Cu, or the cursor Cu is located at a position where the multiplication symbol (×, or ·) is omitted, the inverse number input response process is invalidated.

For this reason, it is possible to preliminarily prevent a defect in which a mathematical expression part which is not an inverse number target will become an inverse number target in the mathematical expression.

In addition, according to the mathematical expression display control function of the scientific electronic calculator 10 with the configuration, a chunk region of a mathematical expression which is detected as an inverse number target in a reverse direction from a position of the cursor Cu is temporarily identification display H before being replaced with a fraction an inverse number. Therefore, a user can clearly confirm a mathematical expression part which is an inverse number target, and thus it is possible to effectively learn how the mathematical expression part is replaced.

According to the mathematical expression display control function of the scientific electronic calculator 10 with the configuration, in a case where a chunk region of a mathematical expression detected as the inverse number target is a fraction, a fraction obtained by replacing a denominator and a numerator thereof with each other is displayed as an inverse number, and thus it is possible to learn calculation regarding an inverse number in keeping with learning of an inverse number of elementary and middle school students.

According to the mathematical expression display control function of the scientific electronic calculator 10 with the configuration, in a case where a chunk region of a mathematical expression detected as the inverse number target is a decimal, the decimal is converted into a fraction, and then a fraction obtained by replacing a denominator and a numerator thereof with each other is displayed as an inverse number, and thus it is possible to also appropriately learn calculation regarding an inverse number targeting a decimal in association with a fraction.

According to the mathematical expression display control function of the scientific electronic calculator 10 with the configuration, based on a changing process between the scientific inverse mode Ms and the educational inverse mode Me, in a state in which the scientific inverse mode Ms is set, a fraction as an inverse number which has the detected chunk region of the mathematical expression as a denominator and "1" as a numerator can be displayed, and, in a state in which the educational inverse mode Me is set, a fraction as an inverse number obtained by replacing the denominator and the numerator thereof with each other can be displayed.

In addition, according to the mathematical expression display control function of the scientific electronic calculator 10 with the configuration, the [Simp1/☐] (÷fraction simplification) key 13si is provided, and when the [Simp1/☐] (÷fraction simplification) key 13si is input, in a case where a mathematical expression part which is "÷fraction" is right in front of the cursor Cu, the mathematical expression part which is "÷fraction" can be simplified to "×fraction" as an inverse number which is obtained by replacing the denominator and the numerator thereof with each other, and can be displayed.

In addition, a notation form of the [1/☐] (inverse number) key 13i in the above-described embodiment is not particularly limited, and may take a natural notation form of a mathematical expression, such as "1/X" by setting an inverse number target as a denominator and "1" as a numerator. Further, in the present invention, a chunk region of a mathematical expression which is an inverse number function target is detected in a front direction from a position of the cursor, but the chunk region of a mathematical expression which is an inverse number function target may be detected in a rear direction from the position of the cursor. Furthermore, the chunk region of a mathematical expression which is an inverse number function target may be detected in both of a front direction and a rear direction from a position of the cursor.

In the series of inverse number input response processes described with reference to FIGS. 6 to 8 and FIGS. 10A to 17F, in any embodiment, the cursor Cu is displayed at an arbitrary position of a mathematical expression which is input by a user and is displayed, and when the [1/☐] (inverse number) key 13i is input, a chunk region of a mathematical expression which is an inverse number target is detected in a reverse direction from the position of the cursor Cu, and thus a fraction as an inverse number of the detected chunk region of the mathematical expression replaces the same chunk region so as to be displayed.

In contrast, as described below in another embodiment, a function of allowing a user to easily input a fraction as an inverse number of any numerical value may be added when a new numerical value is input, during inputting of a mathematical expression, and when a numerical value is input to a numerical value input frame of a mathematical expression.

Another Embodiment

FIG. 20 is a flowchart illustrating an inverse number input response process of another embodiment performed in the mathematical expression display control process of the scientific electronic calculator 10.

Figure 21:
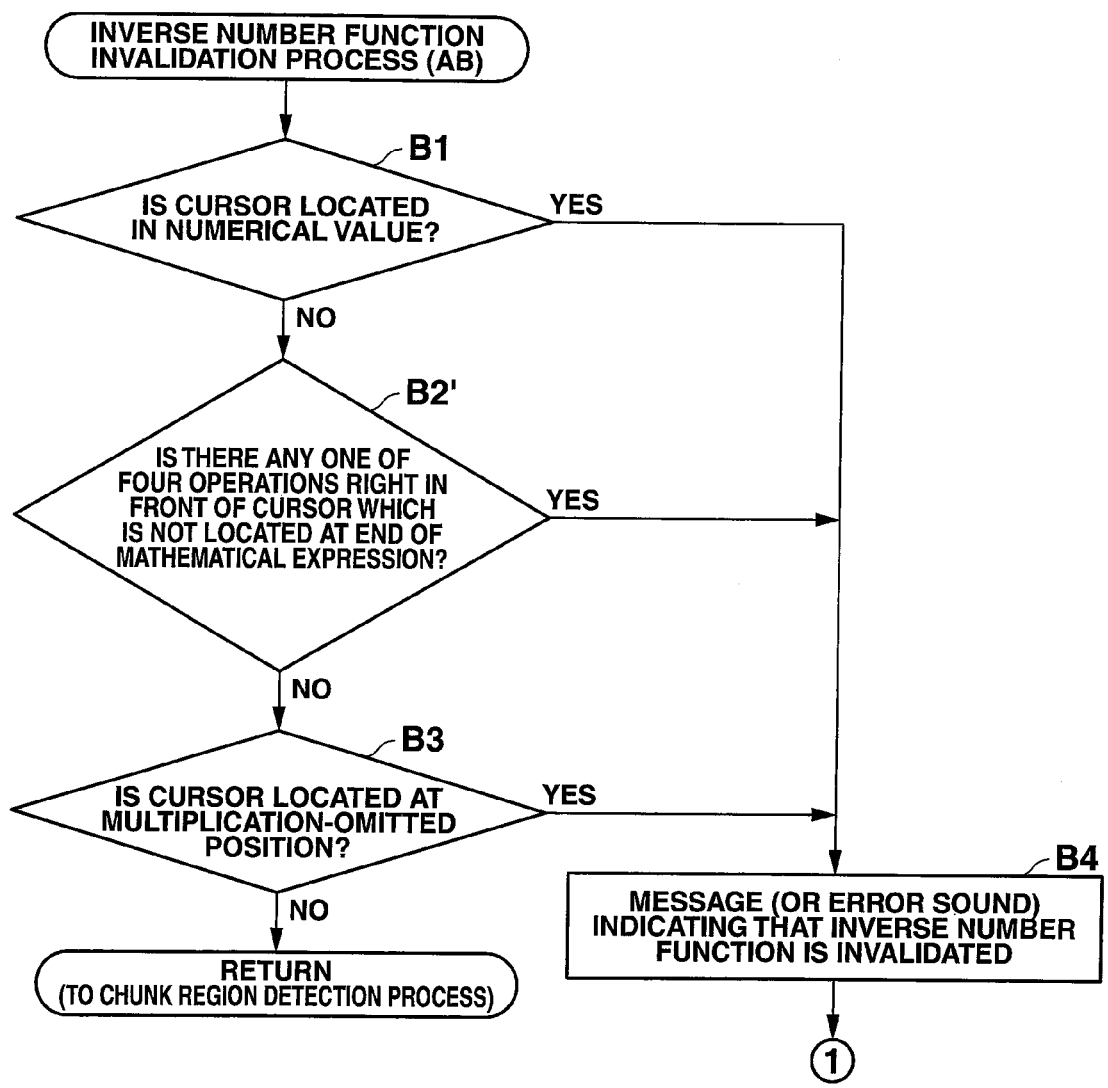
FIG. 21 is a flowchart illustrating an inverse number function invalidation process performed in the inverse number input response process of another embodiment of the scientific electronic calculator.

FIG. 21 is a flowchart illustrating an inverse number function invalidation process performed in the inverse number input response process of another embodiment of the scientific electronic calculator 10.

The inverse number input response process of another embodiment illustrated in FIG. 20 is different from the inverse number input response process illustrated in FIG. 6 in that steps A01 to A06 are additionally provided before proceeding to the inverse number function invalidation process (step AB).

In other words, in the inverse number input response process (SA') of another embodiment, when the [1/☐] (inverse number) key 13i is input, first, it is determined whether or not the cursor Cu is located at a position in a numerical value input frame (☐) for inputting an argument of a function (an integral, a square root, an exponentiation, a fraction, or the like) (step A01), whether or not a numerical value is in a state of not being input (step A02), and whether or not the cursor Cu is located at the end (last part) of a mathematical expression and there is any one of four operations (arithmetic symbols) right in front of the cursor (step A03).

In addition, if it is determined that the cursor Cu is located at a position of the numerical value input frame ☐ for inputting an argument of a function (step A01 (Yes)), the input frame ☐ is replaced with a fraction "1/☐" for inputting an inverse number which has the input frame ☐ as a denominator and "1" as a numerator, so as to be displayed, and the cursor Cu is moved to the position of the input frame ☐ (step A04).

If it is determined that a numerical value is in a state of not being input (step A02 (Yes)), a fraction "1/☐" for inputting an inverse number which has the numerical value input frame ☐ as a denominator and "1" as a numerator is displayed, and the cursor Cu is moved to the position of the numerical value input frame ☐ (step A05).

If it is determined that the cursor Cu is located at the end (last part) of a mathematical expression and there is any one of four operations (arithmetic symbols) right in front of the cursor (step A03 (Yes)), the fraction "1/☐" for inputting an inverse number is displayed at the end of the mathematical expression, and the cursor Cu is moved to the position of the input frame ☐ (step A06).

In addition, the inverse number function invalidation process performed in the inverse number input response process of another embodiment illustrated in FIG. 21 is different from the inverse number function invalidation process illustrated in FIG. 7 in that the premise, "a cursor is not located at the end (last part) of a mathematical expression" is clarified in the condition of step B2, "is there any one of four operations (arithmetic symbols) right in front of the cursor".

In other words, in the inverse number function invalidation process, a case where an arithmetic symbol of any one of four operations is right in front of the cursor Cu and thus the inverse number function is invalidated is limited to a case where the cursor Cu is located not at the end (last part) of the mathematical expression but in the middle of the mathematical expression.

FIGS. 22A to 22E are diagrams illustrating a display operation (first) based on a user's operation during the inverse number input response process of another embodiment of the scientific electronic calculator 10.

Figure 22A:
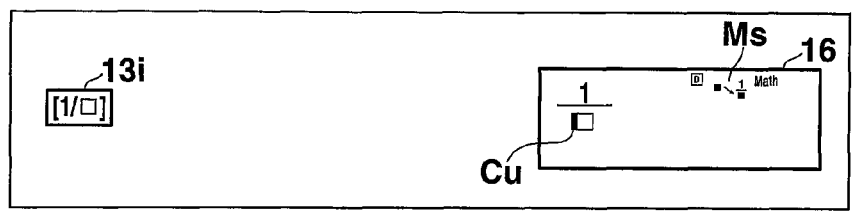
FIGS. 22A to 22E are diagrams illustrating a display operation (first) based on a user's operation during the inverse number input response process of another embodiment of the scientific electronic calculator.

When the user intends to input an inverse number of "12" in a state in which a numerical value is not input on the display unit 16, as illustrated in FIG. 22A, if the [1/☐] (inverse number) key 13i is input (step S2 (Yes)), it is determined that a numerical value is in a state of not being input (step A02 (Yes)) due to the inverse number input response process (SA'). A fraction "1/☐" for inputting an inverse number which has a numerical value input frame ☐ as a denominator and "1" as a numerator is displayed, and the cursor Cu is moved to the position of the numerical value input frame ☐ so as to be displayed (step A05).

Figure 22B:
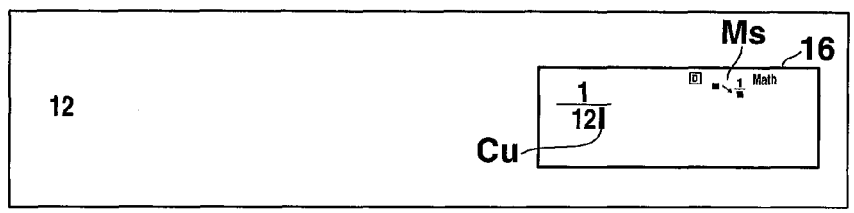

In addition, as illustrated in FIG. 22B, if a numerical value "12" is input, the numerical value "12" is input to the numerical value input frame ☐, at which the cursor Cu is located, of the fraction "1/☐" for inputting an inverse number so as to be displayed (steps S1→S9), and an inverse number "1/12" of "12" can be easily input in a fraction format in an intuitive input procedure.

Figure 22C:
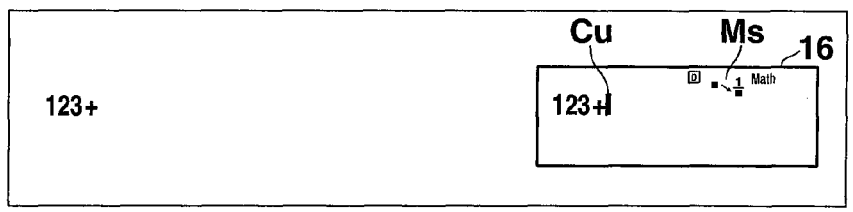
Figure 22D:
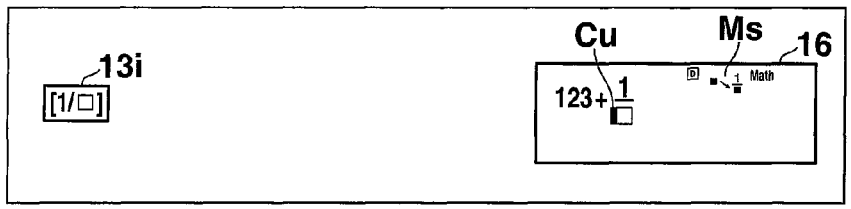

In addition, as illustrated in FIG. 22C, in a state in which a mathematical expression "123+" is input and displayed (steps S1→S9), and the cursor Cu is located at the end (last part) of the mathematical expression, when the user intends to input an inverse number of "4" subsequently thereto, if the [1/☐] (inverse number) key 13i is input as illustrated in FIG. 22D (step S2 (Yes)), it is determined that there is any one of four operations (arithmetic symbols) right in front of the cursor (step A03 (Yes)) due to the inverse number input response process (SA'), the fraction "1/☐" for inputting an inverse number is displayed at the end of the mathematical expression, and the cursor Cu is moved to the position of the input frame ☐ so as to be displayed (step A06).

Figure 22E:
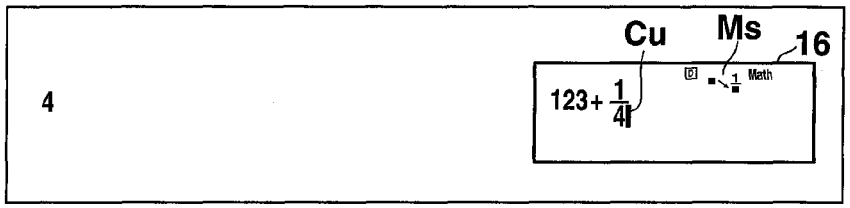

Further, if a numerical value "4" is input as illustrated in FIG. 22E, the numerical value "4" is input to the numerical value input frame ☐, at which the cursor Cu is located, of the fraction "1/☐" for inputting an inverse number so as to be displayed (steps S1→S9), and an inverse number "1/4" of "4" can be easily input in a fraction format in an intuitive input procedure subsequently to the mathematical expression "123+".

FIGS. 23A to 23E are diagrams illustrating a display operation (second) based on a user's operation during the inverse number input response process of another embodiment of the scientific electronic calculator 10.

Figure 23A:
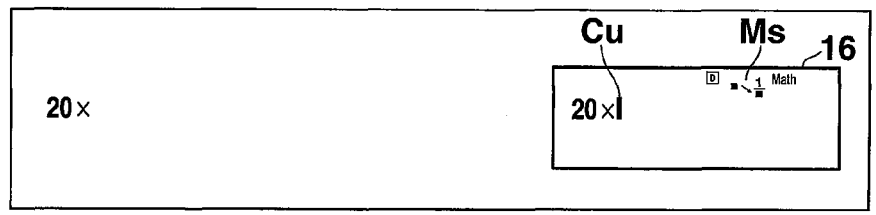
FIGS. 23A to 23E are diagrams illustrating a display operation (second) based on a user's operation during the inverse number input response process of another embodiment of the scientific electronic calculator.
Figure 23B:
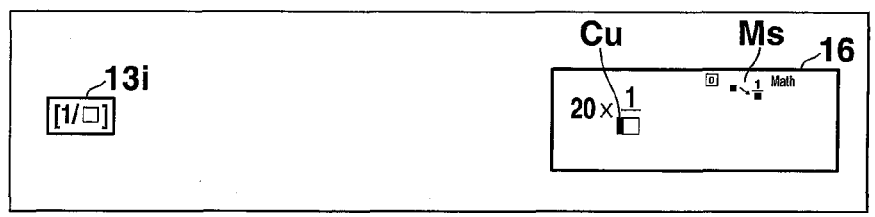

In addition, as illustrated in FIG. 23A, in a state in which a mathematical expression "20×" is input and displayed (steps S1→S9), and the cursor Cu is located at the end (last part) of the mathematical expression, when the user intends to input an inverse number of "3" subsequently thereto, if the [1/☐] (inverse number) key 13i is input as illustrated in FIG. 23B (step S2 (Yes)), it is determined that there is any one of four operations (arithmetic symbols) right in front of the cursor (step A03 (Yes)) due to the inverse number input response process (SA'), the fraction "1/☐" for inputting an inverse number is displayed at the end of the mathematical expression, and the cursor Cu is moved to the position of the input frame ☐ so as to be displayed (step A06).

Figure 23C:
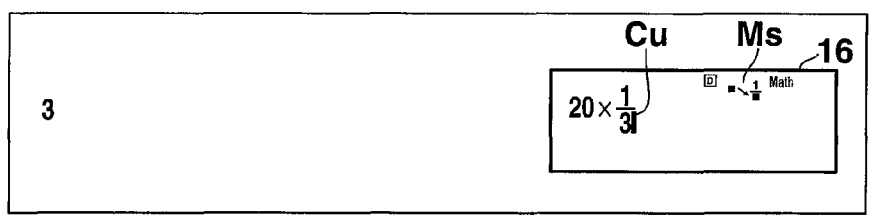

Further, if a numerical value "3" is input as illustrated in FIG. 23C, the numerical value "3" is input to the numerical value input frame ☐, at which the cursor Cu is located, of the fraction "1/☐" for inputting an inverse number so as to be displayed (steps S1→S9), and an inverse number "1/3" of "3" can be easily input in a fraction format in an intuitive input procedure subsequently to the mathematical expression "20×".

Figure 23D:
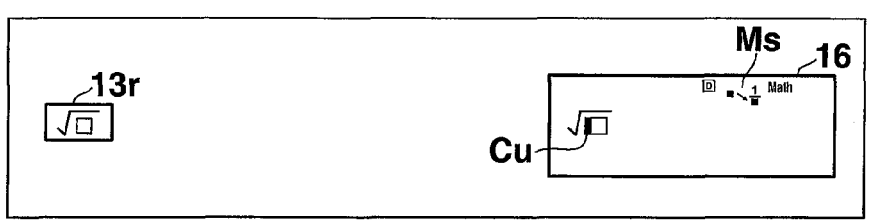
Figure 23E:
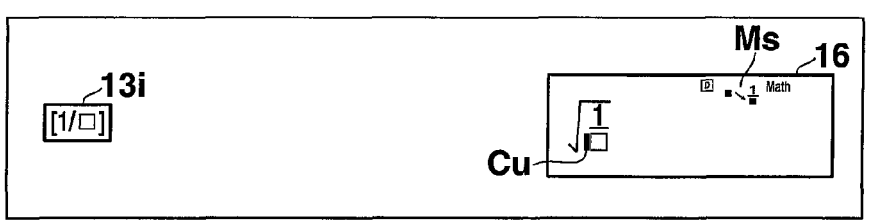

In addition, as illustrated in FIG. 23D, in a state in which a mathematical expression "√☐" is displayed based on inputting of the [√☐] (root) key 13r, and the cursor Cu is displayed at a position of the numerical value input frame ☐ (steps S1→S9), when the user intends to input an inverse number of a numerical value as an argument of the root, if the [1/☐] (inverse number) key 13i is input as illustrated in FIG. 23E (step S2 (Yes)), it is determined that the cursor Cu is located at a position of the numerical value input frame ☐ for inputting an argument of the function (square root) (step A01 (Yes)) due to the inverse number input response process (SA'), the fraction "1/☐" for inputting an inverse number replaces the numerical value input frame ☐ so as to be displayed at the position thereof, and the cursor Cu is moved to the position of the input frame □ so as to be displayed (step A04).

Accordingly, a user can easily input an inverse number "1/n" of a numerical value "n" to the numerical value input frame □ for inputting an argument of a function in a fraction format in an intuitive input procedure.

FIGS. 24A to 24E are diagrams illustrating a display operation (third) based on a user's operation during the inverse number input response process of another embodiment of the scientific electronic calculator 10.

FIGS. 25A to 25E are diagrams illustrating a display operation (fourth) based on a user's operation during the inverse number input response process of another embodiment of the scientific electronic calculator 10.

Figure 24A:
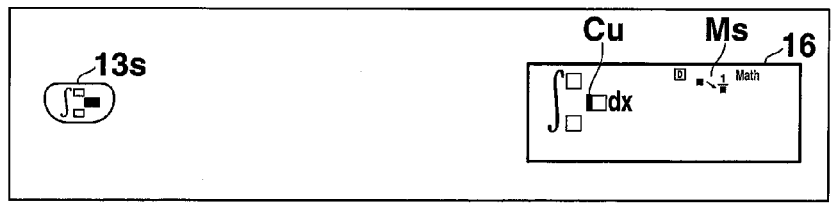
FIGS. 24A to 24E are diagrams illustrating a display operation (third) based on a user's operation during the inverse number input response process of another embodiment of the scientific electronic calculator.
Figure 24B:
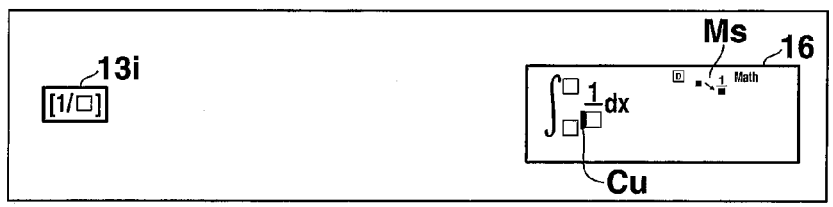

As illustrated in FIG. 24A, in a state in which an integral mathematical expression "$\int_{\square}^{\square} \square dx$" is displayed based on inputting of the [$\int_{\square}^{\square} \square$] (integral) key 13s, and the cursor Cu is displayed at a position of the numerical value input frame □ (steps S1→S9), when the user intends to input an inverse number of "x" as an argument of the integral, if the [1/□] (inverse number) key 13i is input as illustrated in FIG. 24B (step S2 (Yes)), it is determined that the cursor Cu is located at a position of the numerical value input frame □ for inputting an argument of the function (integral) (step A01 (Yes)) due to the inverse number input response process (SA'), the fraction "1/□" for inputting an inverse number replaces the numerical value input frame □ and is displayed at the position thereof, and the cursor Cu is moved to the position of the input frame □ so as to be displayed (step A04).

Figure 24C:
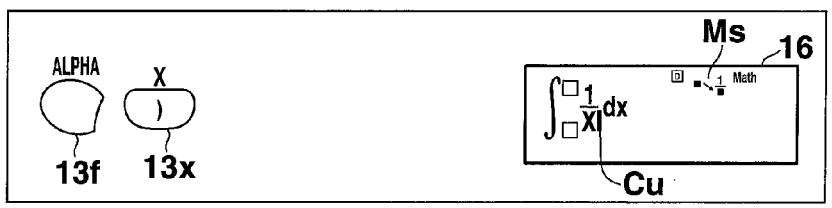

In addition, as illustrated in FIG. 24C, if "x" is input through a simultaneous operation of the shift key 13f and the [x] key 13x, "x" is input to the numerical value input frame □ of the fraction "1/□" for inputting an inverse number where the cursor Cu is located, so as to be displayed (steps S1→S9), and an inverse number "1/x" of "x" can be easily input to the numerical value input frame □ for inputting an argument of the integral in a fraction format in an intuitive input procedure.

Figure 24D:
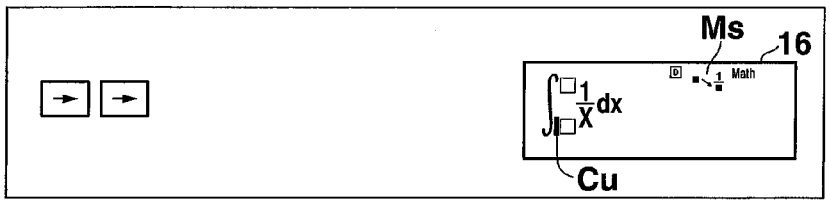
Figure 24E:

Subsequently, in order to input the integral range by using an inverse number having a fraction form, as illustrated in FIG. 24D, the cursor Cu is moved to the numerical value input frame □ at the starting point of the integral (steps S1→S5, and step S6). When the [1/□] (inverse number) key 13i is input as illustrated in FIG. 24E (step S2 (Yes)), it is determined that the cursor Cu is located at a position of the numerical value input frame □ for inputting an argument of the function (step A01 (Yes)), the fraction "1/□" for inputting an inverse number replaces the numerical value input frame □ so as to be displayed at the position thereof, and the cursor Cu is moved to the position of the input frame □ so as to be displayed (step A04).

Figure 25A:
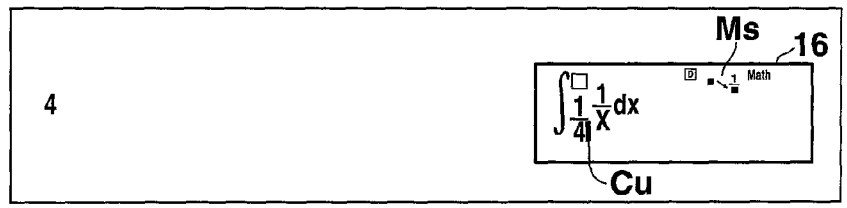
FIGS. 25A to 25E are diagrams illustrating a display operation (fourth) based on a user's operation during the inverse number input response process of another embodiment of the scientific electronic calculator.

Here, if a numerical value "4" is input as illustrated in FIG. 25A, the numerical value "4" is input to the numerical value input frame □, at which the cursor Cu is located, of the fraction "1/□" for inputting an inverse number so as to be displayed (steps S1→S9), and an inverse number "¼" of "4" can be easily input in a fraction format in an intuitive input procedure as a starting point of the integral range.

Figure 25B:
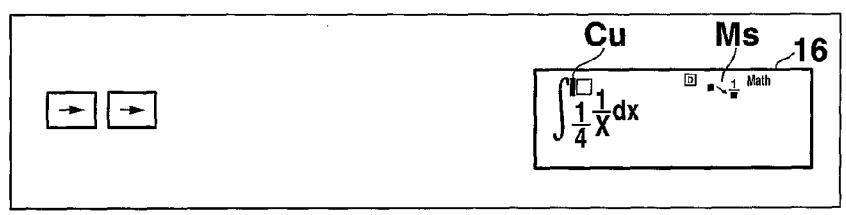
Figure 25C:
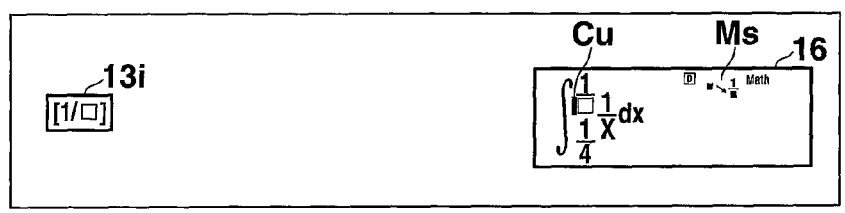

Subsequently, as illustrated in FIG. 25B, the cursor Cu is moved to the numerical value input frame □ at the endpoint of the integral (steps S1→S5, and step S6). When the [1/□] (inverse number) key 13i is input as illustrated in FIG. 25C (step S2 (Yes)), it is determined that the cursor Cu is located at a position of the numerical value input frame □ for inputting an argument of the function (step A01 (Yes)), the fraction "1/□" for inputting an inverse number replaces the numerical value input frame □ so as to be displayed at the position thereof, and the cursor Cu is moved to the position of the input frame □ so as to be displayed (step A04).

Figure 25D:
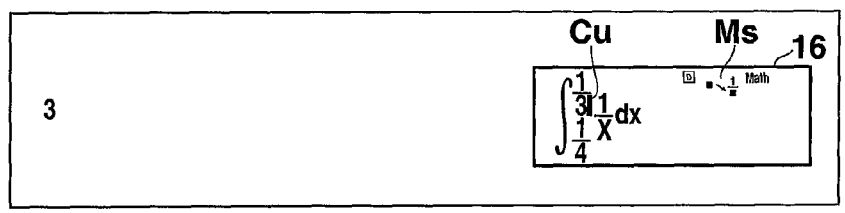

Here, if a numerical value "3" is input as illustrated in FIG. 25D, the numerical value "3" is input to the numerical value input frame □, at which the cursor Cu is located, of the fraction "1/□" for inputting an inverse number so as to be displayed (steps S1→S9), and an inverse number "⅓" of "3" can be easily input in a fraction format in an intuitive input procedure as an endpoint of the integral range.

Figure 25E:
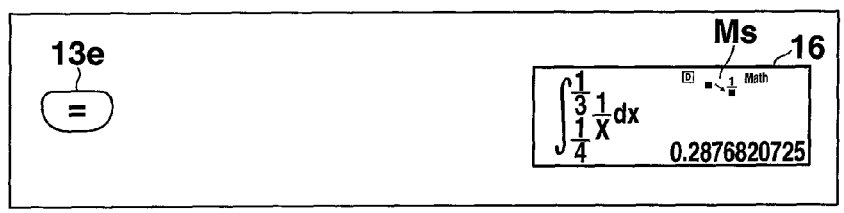

Further, as illustrated in FIG. 25E, if the [=] (execution) key 13e is input (step S8 (Yes)), an operation process is performed on the input integral mathematical expression "$\int_{1/4}^{1/3}(1/x)dx$" (steps S10 and S11), and an operation result "0.2876820725" is displayed (step S12).

Therefore, according to the inverse number input response function of another embodiment of the scientific electronic calculator 10 with the configuration, a chunk region of a mathematical expression which is input by a user and is displayed can be detected based on a position of the cursor Cu, and a fraction as an inverse number of the detected chunk region of the mathematical expression can replace the chunk region so as to be displayed. In addition, also when a new numerical value is input, during inputting of a mathematical expression, and when a numerical value is input to a numerical value input frame of a mathematical expression, a user can easily input a fraction as an inverse number of any numerical value.

Therefore, it is possible to learn calculation regarding an inverse number in association with a fraction in more various stages accompanying a mathematical expression process.

In addition, methods of the respective processes performed by the scientific electronic calculator 10 described in each embodiment, that is, the methods of the inverse number mode setting process illustrated in the flowchart of FIG. 4, the mathematical expression display control process illustrated in the flowchart of FIG. 5, the inverse number input response processes according to the mathematical expression display control process, illustrated in the flowcharts of FIGS. 6, 7 and 8, and the fraction calculation simplifying process using an inverse number performed in the mathematical expression display control process, illustrated in the flowchart of FIG. 18, and inverse number input response processes of another embodiment illustrated in the flowcharts of FIGS. 20 and 21, may all be stored on the external recording medium (23) such as a memory card (a ROM card, a RAM card, or the like), a magnetic disk (a floppy disk, a hard disk, or the like), an optical disc (a CD-ROM, a DVD, or the like), or a semiconductor memory, so as to be distributed as a program which can be executed by a computer. In addition, a computer of an electronic apparatus provided with the display unit (16) reads the program recorded on the external recording medium (23) to the storage device (22), and the read process controls an operation thereof so as to realize the inverse number mode setting function and the mathematical expression display control function described in each embodiment, thereby performing the same processes according to the above-described methods.

In addition, program data for realizing the methods may be transmitted on a network N in a program code form, and the program data is incorporated into the computer of the electronic apparatus provided with the display unit (16) connected to the network N by the communication unit (25), thereby realizing the inverse number mode setting function and the mathematical expression display control function.

The present invention is not limited to the embodiments, and may have various modifications within the scope without departing from the spirit thereof at the time of carrying out the invention. In addition, the embodiments include inventions of various stages, and thus various inventions may be extracted by appropriate combinations of a plurality of disclosed constituent elements. For example, even if some constituent elements are deleted from all the constituent elements shown in the embodiments, or some constituent elements are combined in different forms, a configuration in which the constituent elements are deleted or combined may be extracted as an invention in a case of being capable of solving the problems described in the Problem that the Invention is to Solve and achieving the effects described in the Advantage of the Invention.

What is claimed is:

1. A mathematical expression display control apparatus which naturally displays a mathematical expression, comprising:
    a mathematical expression input unit that recognizes a mathematical expression based on user's input operations;
    a mathematical expression display control unit that displays the mathematical expression recognized by the mathematical expression input unit on a display unit;
    a cursor display control unit that moves and displays a cursor based on a user's operation, with respect to the mathematical expression displayed by the mathematical expression display control unit;
    an inverse number function input unit that recognizes an inverse number function based on a user's input operation;
    an inverse number target detection unit that detects a chunk region of the mathematical expression which is a target of the inverse number function in a predetermined direction from a position of the displayed cursor with respect to the mathematical expression, based on the inverse number function recognized by the inverse number function input unit; and
    an inverse number display control unit that replaces the chunk region of the mathematical expression detected by the inverse number target detection unit with a fraction which has the detected chunk region as a denominator and 1 as a numerator and that displays the replaced fraction.

2. The mathematical expression display control apparatus according to claim 1,
    wherein the predetermined direction is a front direction of the mathematical expression.

3. The mathematical expression display control apparatus according to claim 1,
    wherein, based on the inverse number function recognized by the inverse number function input unit, in the predetermined direction from the position of the displayed cursor, the inverse number target detection unit determines:
        a mathematical expression part from a right parenthesis to a corresponding left parenthesis as a parenthesis chunk region;
        a mathematical expression from an end position of a range to which a function is applied to a leading part of the function as a partial function chunk region;
        a mathematical expression part in a multiplication range where a multiplication symbol is omitted as a multiplication symbol-omitted chunk region, and
    the inverse number target detection unit detects a section before reaching symbols of four operations or a leading part of at lease one chunk region detected by the inverse number target detection unit as an updated chunk region of the mathematical expression which is a target of the inverse number function.

4. The mathematical expression display control apparatus according to claim 1, further comprising:
    an inverse number function invalidation control unit that invalidates an inverse number function in a case where the displayed cursor with respect to the mathematical expression is located between numerical values, just after a symbol of four operations, or at a position where a multiplication symbol is omitted, when the inverse number function is recognized by the inverse number function input unit.

5. The mathematical expression display control apparatus according to claim 1, further comprising:
    an identification display control unit that performs identification display on the chunk region of the mathematical expression detected by the inverse number target detection unit.

6. The mathematical expression display control apparatus according to claim 1,
    wherein the inverse number display control unit includes a fraction inverse number display control unit, and
    when the chunk region of the mathematical expression detected by the inverse number target detection unit is a fraction, the fraction inverse number display control unit replaces the detected chunk region of the mathematical expression with a fraction as an inverse number which is obtained by replacing a denominator and a numerator of the detected fraction with each other, and displays the replaced fraction.

7. The mathematical expression display control apparatus according to claim 1,
    wherein the inverse number display control unit includes a decimal inverse number display control unit, and
    when the chunk region of the mathematical expression detected by the inverse number target detection unit is a decimal, the decimal inverse number display control unit converts the detected decimal into a fraction, replaces the detected chunk region of the mathematical expression with a fraction as an inverse number which is obtained by replacing a denominator and a numerator of the converted fraction with each other, and displays the replaced fraction.

8. The mathematical expression display control apparatus according to claim 7,
    wherein, when the chunk region of the mathematical expression detected by the inverse number target detection unit is a decimal, the decimal inverse number display control unit converts the detected decimal into a fraction, displays the converted fraction temporarily, replaces the detected chunk region of the mathematical expression with a fraction as an inverse number which is obtained by replacing a denominator and a numerator of the converted fraction with each other after the temporary display, and displays the replaced fraction.

9. The mathematical expression display control apparatus according to claim 1, further comprising:
    an inverse number mode setting unit that sets a first inverse number mode or a second inverse number mode based on a user's operation,
    wherein, when the first inverse number mode is set by the inverse number mode setting unit, the inverse number display control unit replaces the chunk region of the mathematical expression detected by the inverse number target detection unit with a fraction as an inverse number which has the chunk region as a denominator and 1 as a numerator, and displays the replaced fraction, and when the second inverse number mode is set by the inverse number mode setting unit:

in a case where the chunk region of the mathematical expression detected by the inverse number target detection unit is a fraction, the inverse number display control unit replaces the detected chunk region of the mathematical expression with a fraction as an inverse number which is obtained by replacing a denominator and a numerator of the detected fraction with each other, and displays the replaced fraction;

in a case where the chunk region of the mathematical expression detected by the inverse number target detection unit is a decimal, the inverse number display control unit converts the detected decimal into a fraction, replaces the detected chunk region of the mathematical expression with a fraction as an inverse number which is obtained by replacing a denominator and a numerator of the converted fraction with each other, and displays the replaced fraction; and in a case where the chunk region of the mathematical expression detected by the inverse number target detection unit is neither a fraction nor a decimal, the inverse number display control unit replaces the detected chunk region of the mathematical expression with a fraction as an inverse number which has the chunk region of the mathematical expression as a denominator and 1 as a numerator, and displays the replaced fraction.

10. The mathematical expression display control apparatus according to claim 1, further comprising:

a simplifying function input unit that recognizes a fraction calculation simplifying function based on a user's operation;

a mathematical expression part determination unit that determines whether or not there is a mathematical expression part in which a symbol of ÷ is followed by a fraction right in front of the displayed cursor, based on the simplifying function recognized by the simplifying function input unit; and a fraction conversion unit, wherein, when the mathematical expression part determination unit determines that there is the mathematical expression part in which the symbol of ÷ is followed by a fraction right in front of the displayed cursor, the fraction conversion unit converts the mathematical expression part into a mathematical expression part in which a symbol of × is followed by a fraction obtained by replacing a denominator and a numerator of the determined fraction with each other.

11. The mathematical expression display control apparatus according to claim 1, further comprising:

an inverse number key that has a fraction symbol displayed in a natural notation form in which an inverse number target is set as a denominator and 1 is set as a numerator, wherein the inverse number function input unit recognizes an inverse number function based on a user's input operation of the inverse number key.

12. The mathematical expression display control apparatus according to claim 1, further comprising:

an inverse number fraction end display control unit, wherein an input frame includes an element which is an inverse number target by using the mathematical expression input unit, when an inverse number function is recognized by the inverse number function input unit in a case where the displayed cursor is located at an end of the mathematical expression and in a case where the displayed cursor is also located just behind any one of symbols of four operations, the inverse number fraction end display control unit replaces the displayed cursor with a fraction for inputting an inverse number which has the input frame as a denominator and 1 as a numerator, displays the replaced fraction, and moves the cursor to the position of the input frame.

13. The mathematical expression display control apparatus according to claim 1, further comprising:

an inverse number fraction display control unit, wherein an input frame includes an element which is an inverse number target by using the mathematical expression input unit, when an inverse number function is recognized by the inverse number function input unit in a case where the mathematical expression is not recognized, or in a case where the cursor is located at an end of the mathematical expression and there is any one of symbols of four operations right in front of the cursor, the inverse number fraction display control unit displays a fraction for inputting an inverse number which has the input frame as a denominator and 1 as a numerator, on the display unit, and displays the cursor at the position of the input frame.

14. The mathematical expression display control apparatus according to claim 1, further comprising:

an inverse number fraction input display control unit, wherein an input frame includes an element of a function expression which is recognized by the mathematical expression input unit, when an inverse number function is recognized by the inverse number function input unit in a case where the displayed cursor is located at the position of the input frame, the inverse number fraction input display control unit converts an input frame for inputting an inverse number into a denominator of a fraction having 1 as a numerator for display, and moves the cursor to the position of the denominator.

15. A mathematical expression display control method for naturally displaying a mathematical expression by controlling a computer of an electronic apparatus provided with a display unit, the method comprising:

recognizing a mathematical expression based on user's input operations;

displaying the recognized mathematical expression on the display unit;

moving and displaying a cursor based on a user's operation with respect to the displayed mathematical expression;

recognizing an inverse number function based on a user's input operation;

detecting a chunk region of the mathematical expression which is a target of the inverse number function in a predetermined direction from a position of the displayed cursor with respect to the mathematical expression, based on the recognized inverse number function;

replacing the detected chunk region of the mathematical expression with a fraction which has the detected chunk region as a denominator and 1 as a numerator; and displaying the replaced fraction.

16. A non-transitory computer readable medium recording a control program that causes a mathematical expression to be naturally displayed by controlling a computer of an electronic apparatus provided with a display unit, the computer readable medium to cause the computer comprising:

recognizing a mathematical expression based on user's input operations;

displaying the recognized mathematical expression on the display unit;
moving and displaying a cursor based on a user's operation with respect to the displayed mathematical expression;
recognizing an inverse number function based on a user's input operation;
detecting a chunk region of the mathematical expression which is a target of the inverse number function in a predetermined direction from a position of the displayed cursor with respect to the mathematical expression, based on the recognized inverse number function;
replacing the detected chunk region of the mathematical expression with a fraction which has the detected chunk region as a denominator and 1 as a numerator; and
displaying the replaced fraction.

* * * * *